(12) United States Patent
Bouvier et al.

(10) Patent No.: US 11,185,795 B2
(45) Date of Patent: Nov. 30, 2021

(54) TECHNIQUES FOR THERMALLY INSULATING A CHROMATOGRAPHIC COLUMN

(71) Applicant: Waters Technologies Corporation, Milford, MA (US)

(72) Inventors: Edouard S. P. Bouvier, Stow, MA (US); Joseph A. Jarrell, Newton Highlands, MA (US); Wade P. Leveille, Douglas, MA (US); Fabrice Gilles Ernest Gritti, Franklin, MA (US); Theodore A. Dourdeville, Providence, RI (US); Michael O. Fogwill, South Grafton, MA (US)

(73) Assignee: Waters Technologies Corporation, Milford, MA (US)

( * ) Notice: Subject to any disclaimer, the term of this patent is extended or adjusted under 35 U.S.C. 154(b) by 603 days.

(21) Appl. No.: 15/487,599

(22) Filed: Apr. 14, 2017

(65) Prior Publication Data
US 2017/0282096 A1    Oct. 5, 2017

Related U.S. Application Data

(63) Continuation-in-part of application No. 14/406,279, filed as application No. PCT/US2013/047800 on Jun. 26, 2013, now Pat. No. 10,413,846.
(Continued)

(51) Int. Cl.
*B01D 15/16* (2006.01)
*B01D 15/20* (2006.01)
(Continued)

(52) U.S. Cl.
CPC .......... *B01D 15/161* (2013.01); *B01D 15/20* (2013.01); *B01D 15/22* (2013.01); *G01N 30/30* (2013.01);
(Continued)

(58) Field of Classification Search
CPC ...... B01D 15/161; B01D 15/22; B01D 15/20; G01N 30/30; G01N 30/54; G01N 30/88;
(Continued)

(56) References Cited

U.S. PATENT DOCUMENTS

| 3,732,982 A | 5/1973 | Dunnill et al. |
| 4,427,123 A | 1/1984 | Komeda et al. |

(Continued)

FOREIGN PATENT DOCUMENTS

| CN | 104101670 A | 10/2014 |
| EP | 0305817 A2 | 3/1989 |

(Continued)

OTHER PUBLICATIONS

PlasticsEurope, "Polyolefins", PlasticsEurope. Accessed Nov. 8, 2019. (Year: 2019).*

(Continued)

*Primary Examiner* — Benjamin L Lebron
(74) *Attorney, Agent, or Firm* — Kacvinsky Daisak Bluni PLLC

(57) ABSTRACT

Apparatus and methods for performing chromatography may include a chromatography column and a vacuum insulated jacket having an inner wall and an outer wall. A vacuum area may be formed between the inner wall and the outer wall. The inner wall of the vacuum insulated jacket may surround the chromatography column. A gap may be formed between an outer wall of the chromatography column and the inner wall of the vacuum insulated jacket. The vacuum insulated jacket may extend beyond one or more end frits of the column. The gap may be filled with one or more materials so as to form an insulating or thermal barrier.

25 Claims, 22 Drawing Sheets

Related U.S. Application Data

(60) Provisional application No. 62/323,325, filed on Apr. 15, 2016, provisional application No. 61/668,560, filed on Jul. 6, 2012.

(51) Int. Cl.
| | |
|---|---|
| *B01D 15/22* | (2006.01) |
| *G01N 30/30* | (2006.01) |
| *G01N 30/60* | (2006.01) |
| *G01N 30/02* | (2006.01) |
| *G01N 30/32* | (2006.01) |

(52) U.S. Cl.
CPC ......... *G01N 30/6052* (2013.01); *G01N 30/32* (2013.01); *G01N 2030/027* (2013.01); *G01N 2030/3007* (2013.01); *G01N 2030/3046* (2013.01)

(58) Field of Classification Search
CPC ..... G01N 2030/3084; G01N 2030/889; G01N 2030/027; G01N 2030/3038; G01N 2030/3046; G01N 2030/3007; G01N 2030/3015; G01N 2030/3061; G01N 30/6052

See application file for complete search history.

(56) References Cited

U.S. PATENT DOCUMENTS

| | | | |
|---|---|---|---|
| 4,451,363 | A | 5/1984 | Brownlee et al. |
| 4,587,014 | A | 5/1986 | America |
| 4,732,581 | A | 3/1988 | Cheh et al. |
| 4,780,116 | A | 10/1988 | Cheh et al. |
| 4,997,124 | A | 3/1991 | Kitabatake et al. |
| 5,194,225 | A | 3/1993 | Muller et al. |
| 5,638,896 | A | 6/1997 | Nishino et al. |
| 5,851,458 | A | 12/1998 | De Vos et al. |
| 5,965,231 | A | 10/1999 | Rotermund et al. |
| 5,983,710 | A | 11/1999 | Uhen et al. |
| 6,029,498 | A | 2/2000 | Walters et al. |
| 6,157,015 | A | 12/2000 | Gaisford et al. |
| 6,217,829 | B1 | 4/2001 | Mustacich et al. |
| 6,666,074 | B2 | 12/2003 | Gerner et al. |
| 7,374,063 | B2 | 5/2008 | Reid |
| 7,681,299 | B2 | 3/2010 | Reid |
| 2003/0200795 | A1 | 10/2003 | Gerner et al. |
| 2006/0054558 | A1 | 3/2006 | Jones et al. |
| 2007/0175270 | A1 | 8/2007 | Lunsford et al. |
| 2008/0020154 | A1 | 1/2008 | Landon et al. |
| 2008/0216823 | A1 | 9/2008 | Kmetovicz et al. |
| 2009/0173146 | A1 | 7/2009 | Pursch et al. |
| 2009/0189015 | A1 | 7/2009 | Alavi |
| 2010/0162801 | A1 | 7/2010 | Hayashi et al. |
| 2010/0227764 | A1 | 9/2010 | Willén et al. |
| 2011/0120031 | A1 | 5/2011 | Scherba |
| 2011/0214770 | A1 | 9/2011 | Knitt |
| 2011/0264084 | A1 | 10/2011 | Reid |
| 2012/0011921 | A1 | 1/2012 | Broeckhoven et al. |
| 2012/0318782 | A1 | 12/2012 | Collins et al. |
| 2014/0090737 | A1 | 4/2014 | Reid |
| 2016/0084425 | A1 | 3/2016 | Reid |

FOREIGN PATENT DOCUMENTS

| | | |
|---|---|---|
| EP | 0410341 A2 | 1/1991 |
| GB | 1059169 A | 2/1967 |
| WO | 2007/059494 A2 | 5/2007 |
| WO | 2014/008058 A1 | 1/2014 |
| WO | WO-2014197783 A1 * | 12/2014 |

OTHER PUBLICATIONS

The Physics Factbook, "Density of Steel", Elert, G., Eds. Accessed Nov. 8, 2019. (Year: 2019).*

Pavia, D.L., Lampman, et al., "Introduction to organic laboratory techniques: a small scale approach; Technique 15: Fractional distillation, azeotropes," United States: Thomson Brooks/Cole. pp. 744-764 (2005).

Poling., B., et al., "The Properties of Gases and Liquids". New York: McGraw-Hill. p. 10.18. (2001).

K. Broeckhoven, et al., "Towards a solution for viscous heating in ultra-high pressure liquid chromatography using intermediate cooling," Journal of Chromatography A, 1217 (2010) 2022-2031.

Joanna Kostka, et al., "Modeling of thermal processes in very high pressure liquid chromatography for a column immersed in a water bath: Application of selected models," Journal of Chromatography A, 1217 (2010) 4704-4712.

Fabrice Gritti, et al, "Optimization of the thermal environment of columns packed with fine particles," 1216 (2009) 1353-1362.

Fabrice Gritti, et al., Achieving quasi-adiabatic thermal environment to maximize resolution power in very high-pressure liquid chromatography, Theory, models, and experiments, Waters Corporation, Mar. 28, 2016.

Fabrice Gritti, et al., Achieving quasi-adiabatic thermal environment to maximize resolution power in very high-pressure liquid chromatography, Theory, models, and experiments, Journal of Chromatography A, 1444, Mar. 28, 2016, 86-98.

Fabrice Gritti, et al., "Achieving quasi-adiabatic thermal environment to maximize resolution power in very high-pressure liquid chromatography Theory, models, and experiments", Journal of Chromatography A, S0021-9673(16)30367-3, http://dx.doi.org/doi:10.1016/j.chroma.2016.03.070, Mar. 23, 2016.

Fabrice Gritti, "Measurement of the axial and radial temperature profiles of a chromatographic column Influence of thermal insulation on column efficiency," Science Diet, Journal of Chromatography A, 1138 (2007) 141-157.

Fabrice Gritti, "Consequences of the radial heterogeneity of the column temperature at high mobile phase velocity," Science Diet, Journal of Chromatography A, 1166 (2007) 47-60.

Fabrice Gritti,"Influence of Viscous Friction Heating on the Efficiency of Columns Operated under Very High Pressures," Analytical Chemistry, May 1, 2009, vol. 81, No. 9, 3365-3384.

Fabrice Gritti,"Complete Temperature Profiles in Ultra-High-Pressure Liquid Chromatography Columns," Analytical Chemistry, Jul. 1, 2008, vol. 80, No. 13, 5009-5020.

Fabrice Gritti, et al., Optimization of the thermal environment of columns packed with very fine particles, Journal of Chromatography A, 1216 (2009) 1353-1362.

International Preliminary Report on Patentability, PCT Application No. PCT/US2013/047800, dated Jan. 15, 2015.

Fabrice Gritti, et al., "Achieving quasi-adiabatic thermal environment to maximize resolution power in very high-pressure liquid chromatography Theory, models, and experiments", Accepted Manuscript, Journal of Chromatography A, S0021-9673(16)30367-3, http://dx.doi.org/doi:10.1016/j.chroma.2016.03.070, Mar. 23, 2016.

Fabrice Gritti, et al., "Achieving Quasi-Adiabatic Thermal Environment to Improve Column Efficiency and Robustness in Liquid and Supercritical Fluid Chromatography", HPLC 2016.

Fabrice Gritti, et al., "Approaching Optimum Speed-Resolution Power Using Low-Density Mobile Phases. Application to Supercritical Fluid Chromatography", ISC2016-Oral-223.

International Search Report dated Nov. 27, 2013.

https://www.youtube.com/watch?v=CVDrz0Xghrn0, Oct. 27, 2014, Youtube video, SureUP vacuum flask production process, 1 page/image.

https://www.youtube.com/watch?v=mThNcqpko7s, Jun. 6, 2013, Youtube video, Vacuum Thermos Factory, 3 pages/image.

International Search Report and Written Opinion for International Application No. PCT/US2017/027576 dated Oct. 18, 2017.

International Preliminary Report on Patentability for International Application No. PCT/US2017/027576 dated Oct. 25, 2018.

Combined Search and Examination Report under Sections 17 and 18(3) for Application No. GB2012193.5, dated Nov. 20, 2020, 5 pages.

* cited by examiner

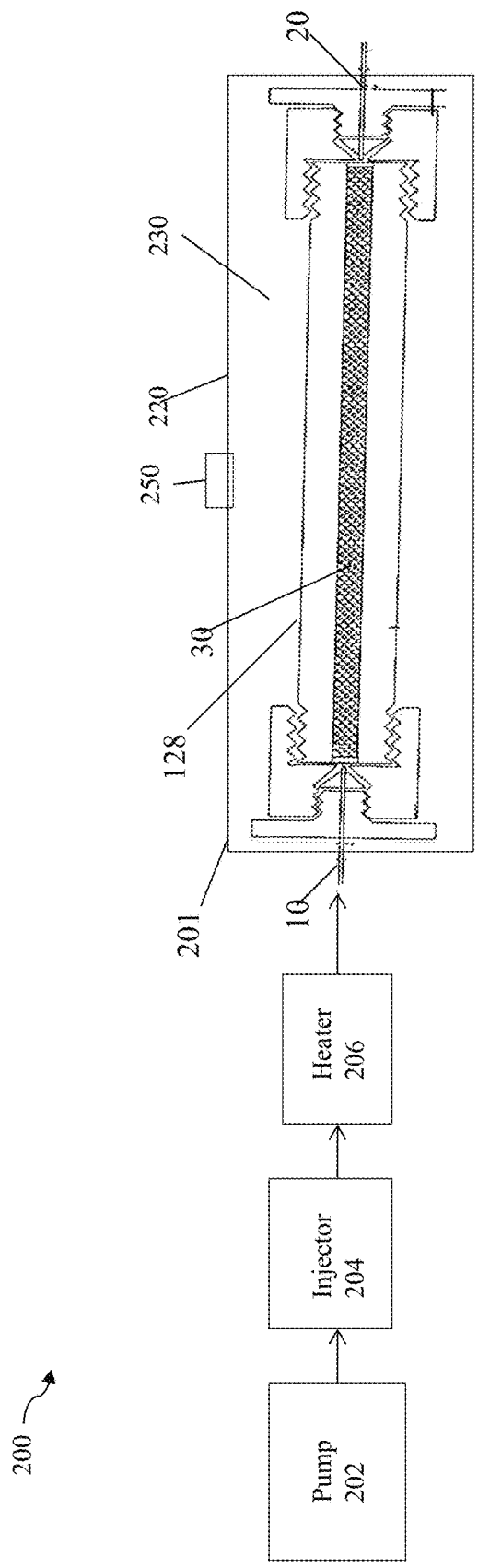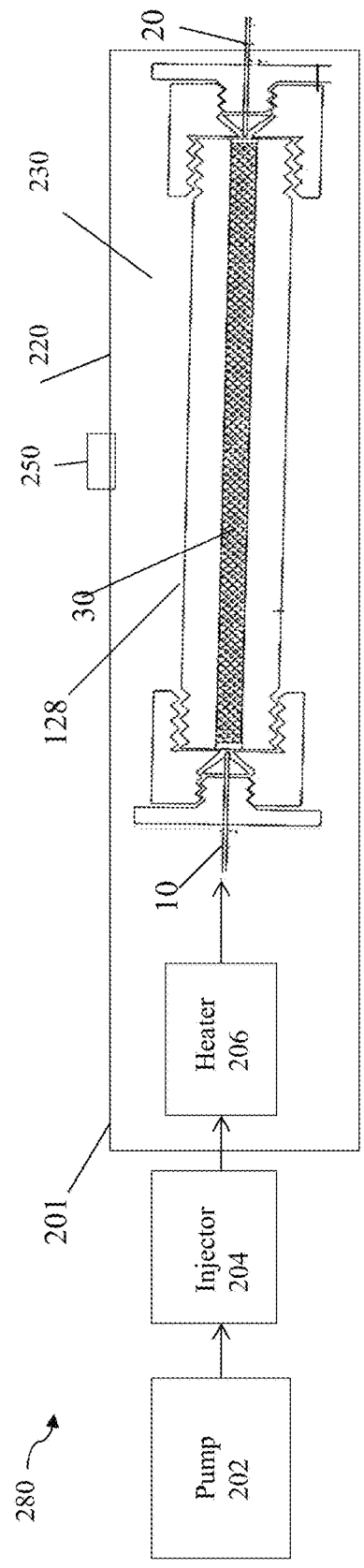
FIG. 5A
FIG. 5B

TECHNIQUES FOR THERMALLY INSULATING A CHROMATOGRAPHIC COLUMN

RELATED APPLICATIONS

This application claims priority to U.S. Provisional Application No. 62/323,325, filed Apr. 15, 2016, TECHNIQUES FOR THERMALLY INSULATING A CHROMATOGRAPHIC COLUMN, and is also a continuation in part of U.S. application Ser. No. 14/406,279, filed Dec. 8, 2014, TECHNIQUES FOR THERMALLY INSULATING A LIQUID CHROMATOGRAPHIC COLUMN, which is the national stage of PCT Application No. PCT/US2013/047800, filed Jun. 26, 2013, TECHNIQUES FOR THERMALLY INSULATING A LIQUID CHROMATOGRAPHIC COLUMN, which claim priority to U.S. Provisional Application No. 61/668,560, filed Jul. 6, 2012, TECHNIQUES FOR THERMALLY INSULATING A LIQUID CHROMATOGRAPHIC COLUMN, all of which are incorporated by reference herein.

TECHNICAL FIELD

This application generally relates to techniques for use with chromatography, and more particularly to thermally insulating a chromatography column.

BACKGROUND INFORMATION

Chromatography is a technique for separating compounds, such as those held in solution, where the compounds will exhibit different affinity for a separation medium in contact with the solution. As the solution flows through such an immobile separation medium, the compounds separate from one another. Common chromatographic separation instruments include liquid chromatography (LC) systems. Such LC systems are known and used for analyzing sample solutions that may include different chemical compounds. LC systems may operate at high pressures such as at 34.47 MPa (5,000 PSI) and greater. A typical LC system includes a pump for pumping a liquid solution, an injector for injecting the sample into the liquid fluid stream, a chromatography column packed with packing material used as the separation medium and tubing for carrying the sample solution and liquid fluid from the injector to the chromatography column. The tubing may then be used to further transport the sample solution output from the LC column to a detector for analyzing the sample solution. The detector may be any suitable detector such as a mass spectrometer, a UV absorbance detector, an evaporative light scattering detector, and the like.

During operation of the LC system, a liquid solvent is pumped into the LC system at high pressure. The injector may be used to inject controlled volumes of a sample, either manually or automatically, into the system where the sample is carried with the liquid solvent in a fluid stream to the packed LC column where the sample may then be separated. Because each of the chemical compounds in the sample solution react in a different manner with the LC column packing material, the various chemical compounds flow through the packed LC column at different rates. The different chemical compounds in the sample solution separate from each other as the sample solution flows through the column. The separated chemical compounds as output from the LC column proceed to the detector where they may be further analyzed, for example, to determine physical characteristics of the compounds for purposes of identification and/or quantification.

SUMMARY OF THE INVENTION

In accordance with one aspect of techniques herein is an apparatus for performing chromatography comprising: a chromatography column; and a vacuum insulated jacket including an inner wall and an outer wall, wherein a vacuum area is formed between the inner wall and the outer wall, and wherein the inner wall of the vacuum insulated jacket surrounds the chromatography column, and wherein a gap is formed between an outer wall of the chromatography column and the inner wall of the vacuum insulated jacket. The gap may include one or more materials forming an insulation layer. The gap may include at least one of: an insulating foam, an insulating plastic, aerogel, and mylarized aluminum. The vacuum insulated jacket may extend beyond a frit at a first end of the chromatography column. The vacuum insulated jacket may extend beyond an end fitting at the first end of the chromatography column. The first end may be at an outlet end of the chromatography column. The first end may be an outlet end of the chromatography column and wherein the vacuum insulated jacket may not extend beyond another frit at inlet end of the chromatography column, and wherein a fluid may enter the chromatography column at the inlet end and may exit the chromatography column at the outlet end. The vacuum insulated jacket may extend beyond frits at both an inlet end and an outlet end of the chromatography column, and wherein a fluid may enter the chromatography column at the inlet end and may exit the chromatography column at the outlet end. A first end of the chromatography column may include an end fitting that is non-threaded. The end fitting may include a face seal. The face seal may be substantially ring shaped or disc shaped. The face seal may be made from any of a metal, a polymeric material, and an elastomeric material. The end fitting of the vacuum insulated jacket may be connected to another component that is any of an injector, a preheater, and a detector. The vacuum insulated jacket may be prefabricated. A single component may include the vacuum insulated jacket integrated with another component that is any of an injector, a preheater, and a detector. The vacuum area may include at least one of: helium, hydrogen, neon, nitrogen, oxygen, carbon dioxide, argon, sulfur hexafluoride, krypton, and xenon. The vacuum insulated jacket may be a tube having walls made of steel, and the vacuum area may be formed in an area between sealed walls of the tube. The vacuum insulated jacket may substantially prevent a radial thermal gradient from forming within the chromatographic column. The apparatus may further include a preheater that heats a mobile phase prior to an inlet of the chromatographic column. The preheater may not heat ambient air surrounding the vacuum insulated jacket. The preheater may be configured to receive control signals that control operation of the preheater in accordance with whether a measured temperature is approximately at a specified set point temperature. The apparatus may further include a temperature sensor configured to obtain the measured temperature at any of: an outlet end of the chromatography column, an inlet end of the chromatography column, and a location within the preheater thereby providing a current ambient temperature within the preheater. The vacuum area may be at a pressure of about $10^{-3}$ atm or less. The vacuum area may be at a pressure less than approximately 760 Torr. The pressure may be included in a range selected from the group consisting of: less than approximately $10^{-4}$ Torr; greater than or equal to approximately $10^{-4}$ Torr and less than approximately $10^{-1}$ Torr; greater than or equal to approximately $10^{-1}$ Torr and less than approximately 200 Torr; greater than or equal to approximately $10^{-1}$ Torr and less than approximately 100 Torr; and greater than or equal to approximately 200 Torr and less than approximately 750 Torr. The pressure may be less than a threshold that is selected from a group consisting of: about 100 Torr, about 200 Torr, about $10^{-1}$ Torr and about $10^{-4}$ Torr. A first end fitting may be at an inlet end of the chromatographic column and a second end fitting may be at an outlet end of the chromatographic column and the first end fitting may have a first weight and the second end fitting may have a second weight, and wherein the second weight may be less than the first weight. The second weight may be at least about 15% less than the first weight. The second weight may be equal to or less than about 50% of the first weight.

In accordance with another aspect of techniques herein is an apparatus for performing chromatography comprising: a chromatography column; and a vacuum insulated jacket including an inner wall and an outer wall, wherein a vacuum area is formed between the inner wall and the outer wall, and wherein the inner wall of the vacuum insulated jacket surrounds the chromatography column, and wherein the vacuum insulated jacket extends beyond a first end of the chromatographic column. The first end may be at an outlet end of the chromatography column. The vacuum insulated jacket may extend beyond a second end of the chromatography column at an inlet end of the chromatography column. The apparatus may include an insulator located between a first surface of a first end fitting and a second surface of the outer wall of the vacuum insulated jacket, wherein the first end fitting may be at the outlet end of the chromatography column. The apparatus may include an insulator located between a third surface of a second end fitting and the second surface of the outer wall of the vacuum insulated jacket, wherein the second end fitting may be at the inlet end of the chromatography column. Any of the first end fitting and the second end fitting may be non-threaded. Any of the first end fitting and the second end fitting may be a face seal. The face seal may be substantially ring shaped or disc shaped. The face seal may be made from any of a metal, a polymeric material, and an elastomeric material. The vacuum insulated jacket may be connected, by the first end fitting at the outlet end of the chromatography column, to another component that is a detector. The vacuum insulated jacket may be connected, by the second end fitting at the inlet end of the chromatography column, to another component that is any of an injector and a preheater. The vacuum area may comprise at least one of: helium, hydrogen, neon, nitrogen, oxygen, carbon dioxide, argon, sulfur hexafluoride, krypton, and xenon. The vacuum insulated jacket may be a tube having walls made of steel, wherein the vacuum area may be formed in an area between sealed walls of the tube, and wherein the chromatography column may be substantially located in an opening through the tube. The apparatus may include a preheater that heats a mobile phase prior to an inlet of the chromatographic column. The preheater may be configured to receive control signals that control operation of the preheater in accordance with whether a measured temperature is approximately at a specified set point temperature. The apparatus may include a temperature sensor configured to obtain the measured temperature at any of: an outlet end of the chromatography column, an inlet end of the chromatography column, and a location within the preheater thereby providing a current ambient temperature within the preheater. The vacuum area may be at pressure less than approximately $10^{-4}$ Torr. The first end fitting may have a first weight and the second end fitting may have a second weight, and wherein the first weight may be less than the second weight. The first weight may be equal to or less than about 15% less than the second weight. A gap may be formed between an outer wall of the chromatography column and the inner wall of the vacuum insulated jacket. The gap may include any of: an insulating foam, an insulating plastic, aerogel, and mylarized aluminum.

In accordance with another aspect of techniques herein is an apparatus comprising: a chamber having a vacuum space formed therein, wherein the chamber has end walls including a first end wall and a second end wall; and a chromatographic column included in the vacuum space, wherein the first end wall is located at an inlet end of the chromatographic column and the second end wall is located at an outlet end of the chromatographic column, wherein a first connection is made between the chromatographic column and a first component using connecting tubing and wherein no portion of the connecting tubing is located within the chamber. A first end fitting and a second end fitting may be located within the vacuum space. The first end fitting may be at the inlet end of the chromatographic column, and the second end fitting may be at the outlet end of the chromatographic column. A first end face of the first end fitting may be located at the first end wall, and a second end fact of the second end fitting may be located at the second end wall. The connecting tubing may include a first portion that connects the first end face of the first end fitting to the first component. The connecting tubing may include a first portion that connects the second end face of the second end fitting to the first component. The apparatus may include a plurality of insulators, wherein the plurality of insulators may include at least one insulator located between any of: contacting surfaces of the first end wall and the first end fitting, contacting surfaces of the second end wall and the second end fitting, contacting surfaces of the first end wall and an inner wall of the chamber, and contacting surfaces of the second end wall and an inner wall of the chamber. The chamber may further comprise a port configured for use with a vacuum pump.

In accordance with another aspect of techniques herein is a method of insulating a chromatography column comprising: receiving a vacuum insulated jacket including an inner wall and an outer wall, wherein a vacuum area is formed between the inner wall and the outer wall; and inserting the chromatography column into the vacuum insulated jacket, wherein the inner wall of the vacuum insulated jacket surrounds the chromatography column and wherein a gap is formed between an outer wall of the chromatography column and the inner wall of the vacuum insulated jacket. The method may include placing one or more materials in the gap to form an insulation layer. The one or more materials may include at least one of: an insulating foam, an insulating plastic, aerogel, and mylarized aluminum.

In accordance with another aspect of techniques herein is a method of insulating a chromatography column comprising: receiving a vacuum insulated jacket including an inner wall and an outer wall, wherein a vacuum area is formed between the inner wall and the outer wall; and inserting the chromatography column into the vacuum insulated jacket, wherein the vacuum insulated jacket extends beyond a first end of the chromatographic column.

In accordance with another aspect of techniques herein is a method of insulating a chromatographic column comprising: creating a vacuum space in a chamber, wherein the chamber has end walls including a first end wall and a second end wall; and placing a chromatographic column in the vacuum space, wherein the first end wall is located at an inlet end of the chromatographic column and the second end wall is located at an outlet end of the chromatographic column, wherein a first connection is made between the chromatographic column and a first component using connecting tubing and wherein no portion of the connecting tubing is located within the chamber.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 5A, 5 B, 6 and 7 are examples of various chromatographic column embodiments and other components in accordance with techniques herein;

DESCRIPTION

Figure 1:
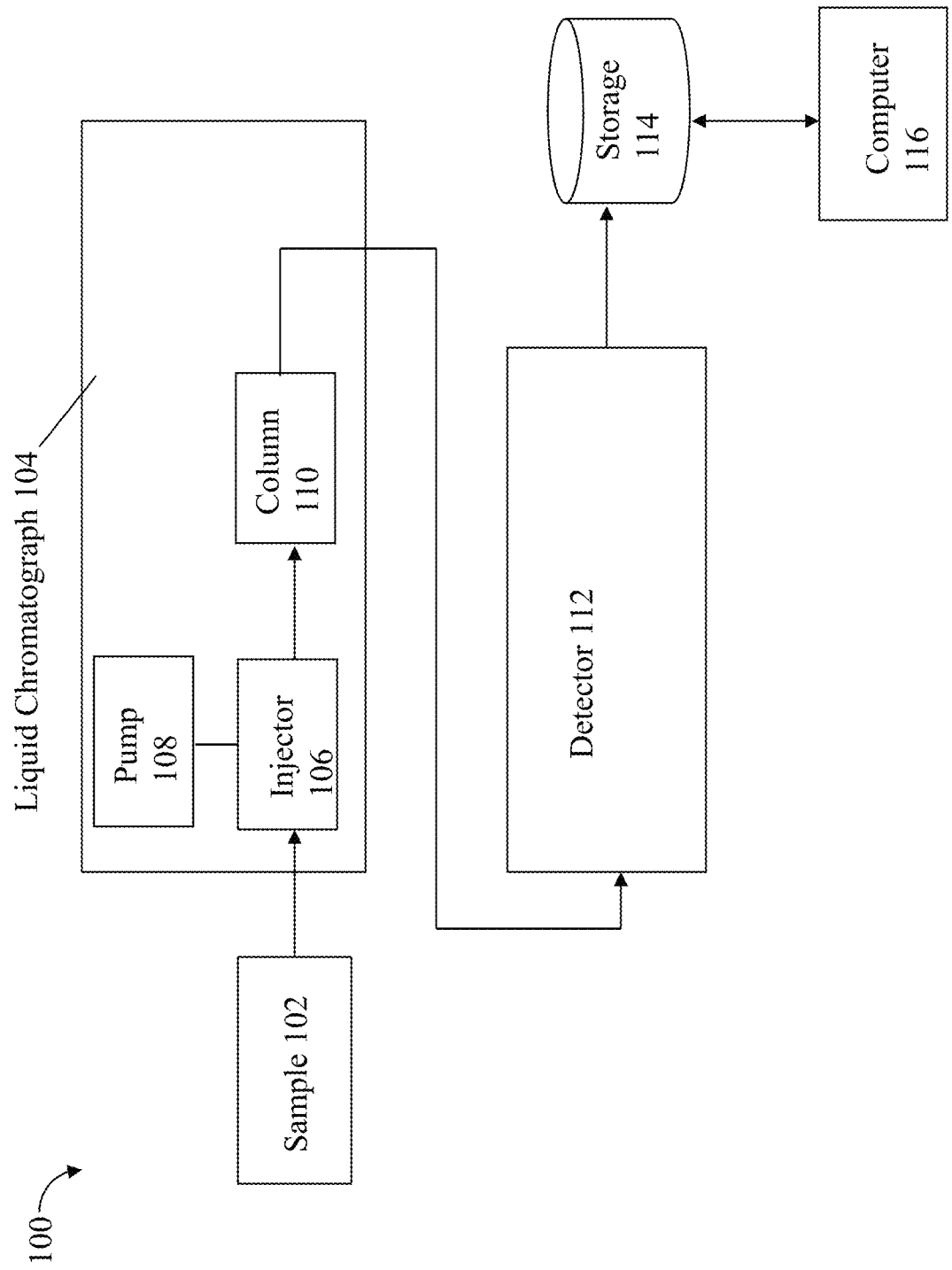
FIG. 1 is an example of a system that may utilize the chromatographic column embodiments described in accordance with techniques herein.

Referring to FIG. 1, shown is an embodiment of a system in accordance with techniques herein. The system 100 may include components such as analytical instruments for performing sample analysis. In one embodiment, the system 100 may be an LC instrument system including a liquid chromatograph (LC) 104, detector 112, storage 114, and computer 116. As will be described in following paragraphs, the system 100 may be used to perform analysis of sample 102 for detecting one or more compounds of interest. The LC 104 may include an injector 106 that receives sample 102, a pump 108, and a column 110. The liquid sample 102 may be introduced as an input to the LC 104. Although not illustrated in FIG. 1, the LC 104 may also include an optional column heater. As described in more detail below, the computer 116 may be used to control operation of the components and used in connection with data acquisition to store analysis data to storage 114. As also described in more detail below, the sample and mobile phase traverse through the fluidic path of the system.

In operation, the sample 102 is injected into the LC 104 via the injector 106. The pump 108 pumps the sample through the column 110 to separate the sample into component parts according to retention time through the column 110. A high pressure stream of chromatographic solvent provided by pump 108 and injector 106 forces sample 102 to migrate through a chromatographic column 110 in the LC 104. Column 110 typically comprises a packed column of porous, non-porous or superficially-porous particles, made of silica, polymer, or an organohybrid silica whose surface may be chemically modified. The output from the column 110 is input to the detector for analysis. The detector 112 may be any suitable detector such as a UV absorbance detector, an evaporative light scattering detector, a mass spectrometer, and the like.

In one embodiment, the LC system may be, for example, a High Performance Liquid Chromatography (HPLC) or an Ultra Performance Liquid Chromatography (UPLC) system such as the ACQUITY UPLC® and nanoACQUITY UPLC® systems from Waters Corporation of Milford Massachusetts. An LC system such as the foregoing from Waters Corporation may operate under high pressure such as in the range of 34.47 MPa (5000 PSI) (e.g., exemplary for some HPLC systems) to 103.42 MPa (15000 PSI) (e.g., exemplary for some UPLC systems).

A control means (not shown) provides control signals for the various power supplies (not shown) which respectively provide the necessary operating potentials for the components of the system 100 such as the 104 and 112. These control signals determine the operating parameters of the instrument. The control means is typically controlled by signals from a computer or processor, such as the computer 116.

The storage 114 may be any one or more different types of computer storage media and/or devices. As will be appreciated by those skilled in the art, the storage 114 may be any type of computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired code, data, and the like, which can accessed by a computer processor.

The computer 116 may be any commercially available or proprietary computer system, processor board, ASIC (application specific integrated circuit), or other component which includes a processor configured to execute code stored on a computer readable medium. The processor, when executing the code, may cause the computer system 116 to perform processing steps such as to access and analyze the data stored on storage 114. The computer system, processor board, and the like, may be more generally referred to as a computing device. The computing device may also include, or otherwise be configured to access, a computer readable medium, such as represented by 114, comprising executable code stored thereon which cause a computer processor to perform processing steps.

One or more molecular species migrates through column 110 and each emerges, or elutes, from column 110 and is detected by detector 112. The time that it takes for a molecule to traverse through the column is commonly is referred to as the molecule's retention time. That is, a molecule that elutes from a column at retention time t in reality elutes over a period of time that is essentially centered at time t. The elution profile over the time period is referred to as a chromatographic peak whereby the retention time for the molecule corresponds to the apex of the profile. The elution profile of a typically well-behaved chromatographic peak can be described by a Normal (Gaussian) distribution. The peak has a width that typically is described by its full width at half height, or half-maximum (FWHM).

The retention time and chromatographic peak profile of a molecule eluting from a chromatographic support matrix (e.g., such packing material of column 110 or other separation medium for separating chemical compounds of a sample solution) is a function of the physical and chemical interaction of that molecule between the support matrix and mobile phase. The degree of interaction that a molecule has between the support matrix and the mobile phase dictates the chromatographic profile and retention time for that molecule. In a complex mixture, each molecule is chemically different. As a result, each molecule can have a different affinity for the chromatographic matrix and the mobile phase. Consequently, each can exhibit a unique chromatographic profile.

When the sample solution flows through the packed LC column at high pressures, frictional heat is generated within the column. The amount of frictional heat generated is a function of several factors such as, for example, the flow rate of the mobile phase, the particle size of the column packing material, and the dimensions (length and inner diameter) of the column. Such frictional heat may result in an increase or difference in the temperature at the center of the column relative to the outer edges or walls of the column thereby causing a radial thermal gradient which adversely affects the performance of the LC system. As known in the art, LC performance may be measured, for example, in terms of efficiency by plate count, reduced plate height, and/or tailing factors. Adversely affecting LC performance may be observed, for example, by having a wider than normal/expected peak width, asymmetrical peak shape, reduced plate count, and the like. For example, the radial thermal gradient, where the temperature at the column center is greater than at the column outer edges, causes the liquid mobile phase passing through the center to have a lower viscosity than at the outer edges. As a result, the liquid mobile phase flows faster through the column center than at the outer edges. Also, since chromatographic retention typically decreases as temperature increases, an analyte migrates faster at the center of the column. To further illustrate, for example, chromatographic peaks may be broader or wider due to such changes in viscosity (and thus flow rate) due to radial thermal gradients in the column as just described. Such increased peak widths may result in overlapping peaks thereby adversely affecting the quality of the information obtained from LC data. Therefore, due to such adverse effects (the foregoing of which is one example), it is desirable to minimize or reduce radial thermal gradients to improve LC performance.

Additionally, such frictional heat may cause a temperature difference with respect to the direction of flow (also referred to as the axial direction with respect to the axis of directional flow) through the LC column. Such a temperature difference in the axial direction may be referred to as an axial thermal gradient and may be measured by determining a temperature $T_{in}$ of the liquid mobile phase entering into the LC column and a temperature $T_{out}$ when exiting the LC column. When the particle size of packing in the LC column is, for example, a 5 micron particle, there may be little difference between Tin and $T_{out}$ in the axial direction (e.g., may be 1 or 2 degrees C.). However, with smaller size particles comprising the LC column packing such as particles having a size of 1.7 microns, the difference between $T_{in}$ and $T_{out}$ in the axial direction is much larger in comparison to the axial thermal gradient for the 5 micron size particle case. The axial thermal gradient may affect retention but may have a minimal or insignificant adverse impact on LC performance.

Generally, any type of temperature gradients with respect to the LC column, (e.g., including any of radial and axial thermal gradients), may have an effect upon mobile phase viscosity, the speed or rate at which an analyte in mobile phase diffuses, and may also affect retentivity (e.g., how an analyte interacts with the surfaces of the particles in the column packing) thereby affecting chromatographic retention time. As noted above, an axial thermal gradient generally does not have a significant negative or adverse effect on chromatographic performance. However, existence of a radial thermal gradient typically does have a significant adverse impact on LC performance such as may be measured in terms of column efficiency.

Through modeling and general testing of column environments including adiabatic, isothermal and ambient, it has been determined that having a column environment of adiabatic (or that which approaches adiabatic conditions as close as possible) is best in efforts to have the smallest or minimal radial thermal gradient and the highest column efficiency (e.g., such as may be measured in terms of USP Plate Counts and/or HETP (Height Equivalent to the Theoretical Plate). Isothermal may be defined as having a constant column temperature at the column outer wall such as, for example, by placing the column in a water bath. Adiabatic may be defined as providing an outer insulation to the column to thereby reduce or eliminate any addition or removal or heat from the column. Ambient may be defined as having the column in still air.

To this end, described herein are embodiments on the LC column which provide for such adiabatic conditions and minimize radial thermal gradients to maximize column efficiency and performance. During operation of the LC system with such a column as described herein with the goal of providing adiabatic conditions, the column heats up naturally via friction as described elsewhere herein. At some point, the column and LC system will reach a steady state temperature. Such a steady state with respect to column temperature may be determined by having $T_{in}$, $T_{out}$, and the difference therebetween (e.g., axial temperature gradient) be relatively or substantially constant. In this steady state with respect to column temperature (as may be determined by obtaining substantially constant values for $T_{in}$, $T_{out}$ and the axial thermal gradient and with adiabatic conditions using the insulated column described herein), the temperature at the column outer wall and at the column center will be substantially the same thereby minimizing or eliminating the radial thermal gradient. Therefore, in such a steady state temperature using the column embodiments described in more detail herein providing adiabatic conditions via column insulation, there will be an axial thermal gradient and minimal radial thermal gradient.

It will be appreciated by those of ordinary skill in the art that the LC system may reach steady state prior to injecting a sample in connection with performing an LC experiment.

Figure 2:
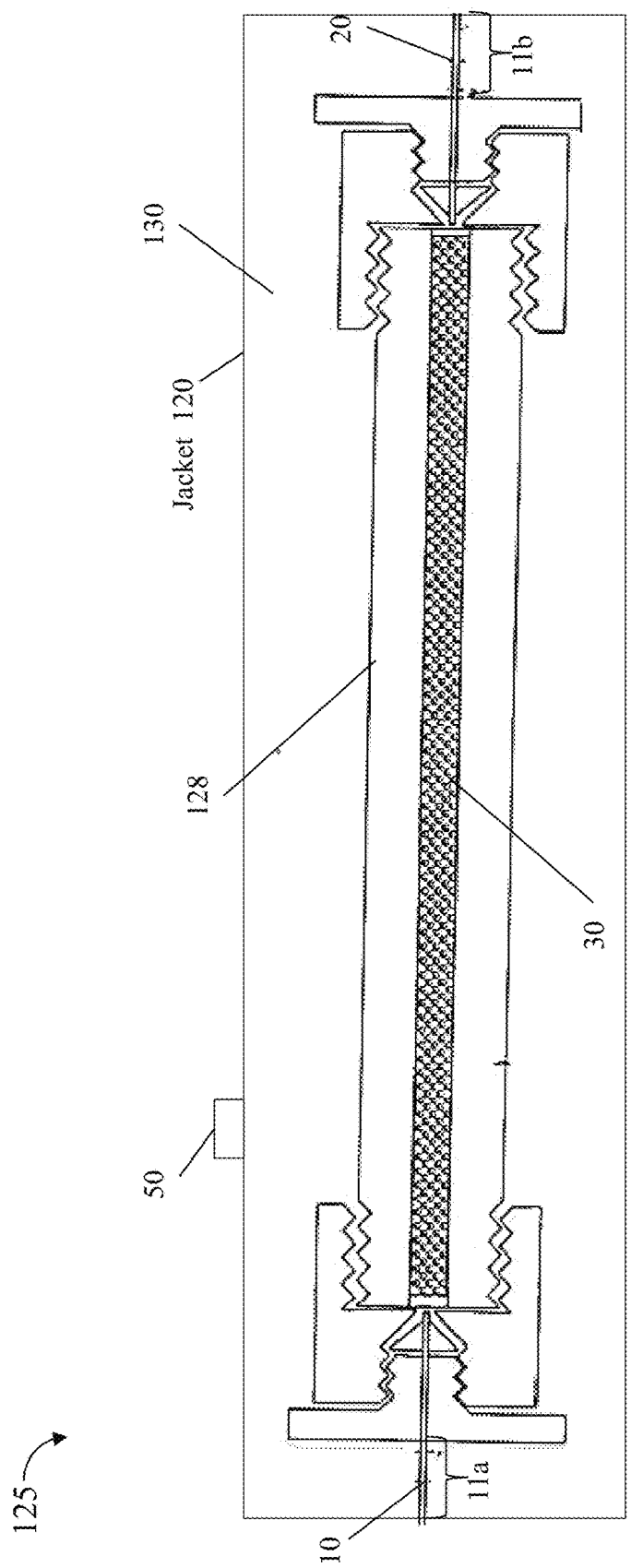
FIGS. 2-4 and 8-10 are examples of various chromatographic column embodiments in accordance with techniques herein.

Referring to FIG. 2, shown is an example of an embodiment of a chromatography column in accordance with techniques herein. The embodiment of FIG. 2 may be used as the column 110 in the system of FIG. 1. FIG. 2 illustrates a side cutaway view of a high performance liquid chromatography (HPLC) column 128 within an insulating layer or member 130 formed between the column 128 and an outer jacket 120. Inlet tube 10 carries sample solution into the HPLC column 128 and outlet tube 20 carries sample solution out of the HPLC column 128. Element 30 represents the chromatographic separation medium, such as beads or other column packing material. The insulating layer or member 130 may provide thermal insulation for the HPLC column capable of operating at pressures in excess of 34.47 MPa (5,000 PSI). In the embodiment of 125, the insulation layer or member 130 may be a vacuum chamber acting as a thermal insulator and having a pressure that is below local atmospheric pressure (e.g., below the atmospheric pressure external to the area 120 or surrounding the jacket 120). Examples of more specific pressure(s) that may be used in an embodiment in connection with the vacuum within the area 130 surrounding the column are provided elsewhere herein. As illustrated, the column 128 may be placed within jacket 120 having suitable airtight sealing to isolate the column 128 (along with other illustrated components attached thereto) located within the jacket 120 from the environment outside the jacket 120. Once the column 128 is placed within the jacket 120, a vacuum may be created in space or chamber 130 by pumping out the air therein surrounding the column 128 within the jacket. The air may be pumped out by connecting a vacuum pump (not illustrated) to through hole 50 of the jacket 120. Once the air has been evacuated from the space 130, the through hole 50 may be sealed off thereby creating a vacuum chamber or space represented by 130 in the area surrounding the column 128 within the jacket 120.

As a first alternative to the foregoing in which a vacuum chamber is created in space 130, the air in space 130 may be displaced with a heavy inert gas such as argon, krypton or xenon. In such an embodiment, a source of the inert gas (not illustrated) may be connected to through hole 50 to displace the atmospheric gas of space 130 with the inert gas. The through hole 50 may then be closed off using any suitable means as described above to form an air tight seal. In this first alternative, the insulating layer 130 may be formed by the inert gas located therein. As yet a further variation to the above prior to closing off through hole 50, once the inert gas is provided in space 130, a vacuum pump may then be attached to through hole 50 to create a vacuum by pumping out the inert gas. Once a sufficient vacuum has been created, the through hole 50 may then be closed off as described above to form a suitable air tight seal.

Thus, based on the foregoing exemplary alternatives, an embodiment may form the insulating layer surrounding the column by pumping out the air or atmospheric gas in the space surrounding the column thereby creating a vacuum chamber (with minimal atmospheric gas) as the insulating layer 130. An embodiment may also form the insulating layer surrounding the column by replacing the air or atmospheric gas in the space surrounding the column with an inert gas thereby creating an inert gas chamber or layer as the insulating layer 130 which is at atmospheric pressure. An embodiment may also form the insulating layer surrounding the column by displacing the air or atmospheric gas in the space surrounding the column with an inert gas and then pumping out the inert gas in the space surrounding the column thereby creating a vacuum chamber (with minimal inert gas) as the insulating layer 130.

In connection with the vacuum that may be formed in the chamber of the insulating layer 130, it should be noted that a true vacuum has the lowest thermal conductivity whereby heat can only be transported by radiative heating. At very low pressure (e.g., approximately less than $10^{-3}$ atm, depending on the dimensions of the chamber), thermal conductivity is directly proportional to pressure. This region is also known in the art as the Knudsen domain, where the mean free path of the molecules is large compared to the dimensions of the chamber. At low pressures (e.g., in the approximate range of $10^{-3}$ atm to about $1 \times 10^{-1}$ atm, or generally approximately less than $10^{-3}$ atm), thermal conductivity is a very weak function of pressure, increasing less than ~1% per bar. Thus, some embodiments may utilize a vacuum having a preferred pressure of approximately equal to, or less than, $10^{-3}$ atm. Other embodiments using techniques herein may utilize other pressures such as in the approximate range of $10^{-3}$ atm to about $1 \times 10^{-1}$ atm although pressures of approximately $10^{-3}$ atm or less may be preferred.

With respect to the gas that may be used in connection with 130 in embodiments described herein such as in the vacuum chamber at one of the pressures described herein, it should be noted that heavy gases provide better thermal insulation than lighter gases, as they have lower thermal conductivity. Thermal conductivity in general decreases as molecular weight increases. An embodiment may use, for example, argon, xenon, and/or krypton which are much heavier than air, and thus have lower thermal conductivity. As another example, an embodiment may form insulating layer 130 using a gas including sulfur hexafluoride.

It should be noted that the column inner diameter may be any suitable dimension, such as 1 mm (millimeter) or greater although the increased benefits from using such a column may be more apparent as the column inner diameter increases (e.g., for example at inner column diameters of 2 mm and greater). An embodiment may also use columns having any particle size for the packing material or, more generally, separation medium. However, columns using smaller particle sizes, (e.g., such as particles having a size of 2.5 microns or smaller) may typically obtain greater benefits because more frictional heat is generated thereby resulting in larger thermal gradients. The outer column wall of column 128 may be made from steel, titanium, or other suitable material able to withstand the HPLC operating pressures such as generally in excess of 34.47 MPa (5,000 PSI). The surrounding jacket 120 may be made from steel or other suitable material into which a through hole 50 may be machined or otherwise formed. The through hole 50 may be sealed in any suitable manner, such as by crimping, capping (e.g., using a removable or permanent cap), and the like, to thereby providing an airtight seal for use in creating the vacuum in space represented by 130. For example, the through hole 50 may be sealed by having a removable cap (e.g. via threading) applied thereto.

In one embodiment, the area 130 may form an insulating layer or member and provide sufficient insulation preventing thermal conductivity between the column 128 and ambient temperature such as of the environment outside of or surrounding the jacket 120. The area denoted as 130 forming the insulating layer or member may provide thermal conductivity, for example, that is approximately at or below 0.02 W/mK. It should be noted that ideally it is desirable for the thermal conductivity provided by 130 to be less than that of air so that, for example, an embodiment may use such gases denoted below having thermal conductivity less than that of air. (e.g., carbon dioxide, argon, krypton, xenon, sulfur hexafluoride). Below is a table of thermal conductivities of some gases at 1 atmosphere, 298 degrees K:

| Compound | Thermal Conductivity (W/mK) |
|---|---|
| Helium | 0.147 |
| Hydrogen | 0.175 |
| Neon | 0.0483 |
| Nitrogen | 0.0255 |
| Oxygen | 0.0263 |
| air | 0.0259 |
| Carbon dioxide | 0.0169 |
| Argon | 0.0174 |
| Sulfur hexafluoride | 0.0121 |
| Krypton | 0.00943 |
| Xenon | 0.00565 |

In connection with the above-reference information for the gases, such information is generally available and known in the art. For example, data for all but Krypton, Xenon, and Sulfur hexafluoride (SF6), and air may be obtained from R C Reid, J M Prausnitz, B E Poling, *The Properties of Gases & Liquids*, 4th Edition, McGraw Hill, 1987. Data for Krypton, Xenon, and Sulfur hexafluoride (SF6), and air may be found, through publically available information in the internet, for example, using Wolfram Alpha™ computation knowledge engine Wolfram Alpha LLC available online at www.wolframalpha.com.

The jacket 120 used in an embodiment may generally be any suitable material that can withstand a vacuum and does not outgas. For example, the jacket 120 may be made from one or more of steel, copper, brass, aluminum or other metals. The column may have walls constructed of, for example, steel or titanium, but, more generally, may be made from any material that can withstand the high pressures and also be chemically inert to a mobile phase and sample utilized in an embodiment. As an alternative, an embodiment may select the column to have walls constructed from a material that does chemically interact with sample (e.g., ceramics will often interact with certain analytes), and coat/clad the interior wall of the column (e.g., which comes into contact with the sample and mobile phase in the fluidic path) with an inert material such as fused silica or PEEK. A preferred vacuum pressure that may be used is described above such as at pressures below $10^{-3}$ atm. The particle size used for the column material may have a size less than 2 microns, such as in the approximate inclusive range of 1.5-2 micron size particles. It should be noted that techniques herein may also be used with larger size particles but that thermal effects become less important for particles of larger sizes such as, for example, particles exceeding the general size range of 5-10 microns, or greater than 5 microns. Thus, thermal effects become more important for smaller sized particles. LC columns of any suitable dimension may be used in connection with techniques herein. Exemplary dimensions for LC columns that may be used in an embodiment may have a length of 20 mm to 300 mm, and a diameter which is approximately equal to or more than 100 μm to about 50 mm. As will be appreciated by those skilled in the art, thermal effects may be insignificant for small diameter columns, for example, approximately less than 100 μm, as heat transfer will minimize radial and axial gradients. At larger diameters, the size of about 50 mm may be based on practical limitations such as due to the pressure rating of the hardware. As diameter increases, it becomes significantly more expensive to make a tube that can withstand the necessary high pressures.

Figure 3:
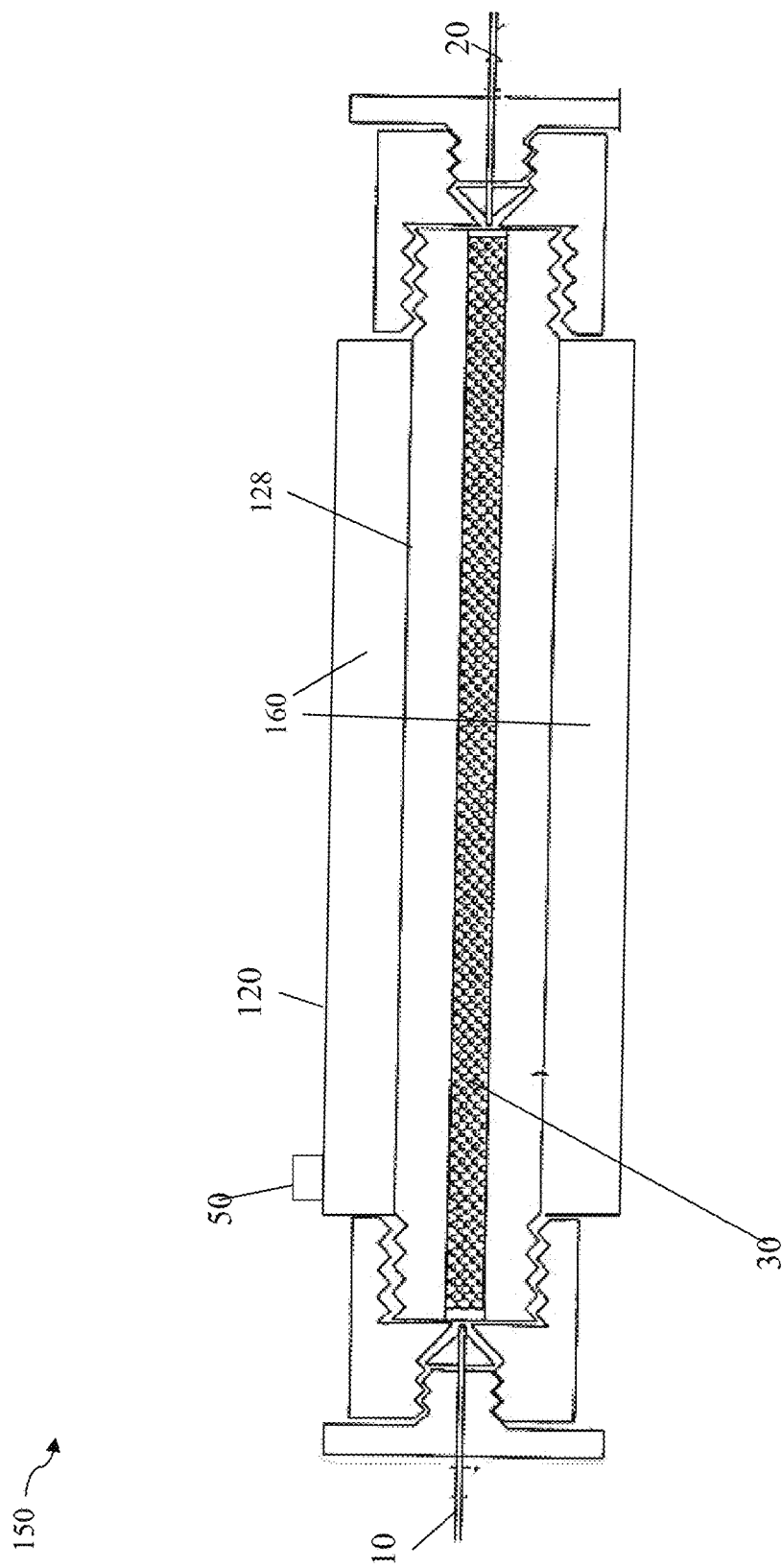

Referring to FIG. 3, shown is an example of another embodiment of a chromatography column in accordance with techniques herein. The embodiment of FIG. 3 may be used as the column 110 in the system of FIG. 1. FIG. 3 includes components similar to those of FIG. 2 with a difference that the insulation member or layer is denoted as 160 (rather than 130 as in FIG. 2) and is included as an integrated part or layer of the column. In the example 150, the column may be characterized as including a first inner portion 128 (the uninsulated column 128 as described above in connection with FIG. 2) surrounded by a second outer portion forming the insulating layer 160. In the example 150 of FIG. 3, the insulating layer 160 may not extend the entire length of the inner portion 128. The insulating layer 160 may be formed as described above in connection with element 130 of FIG. 2.

Figure 4:
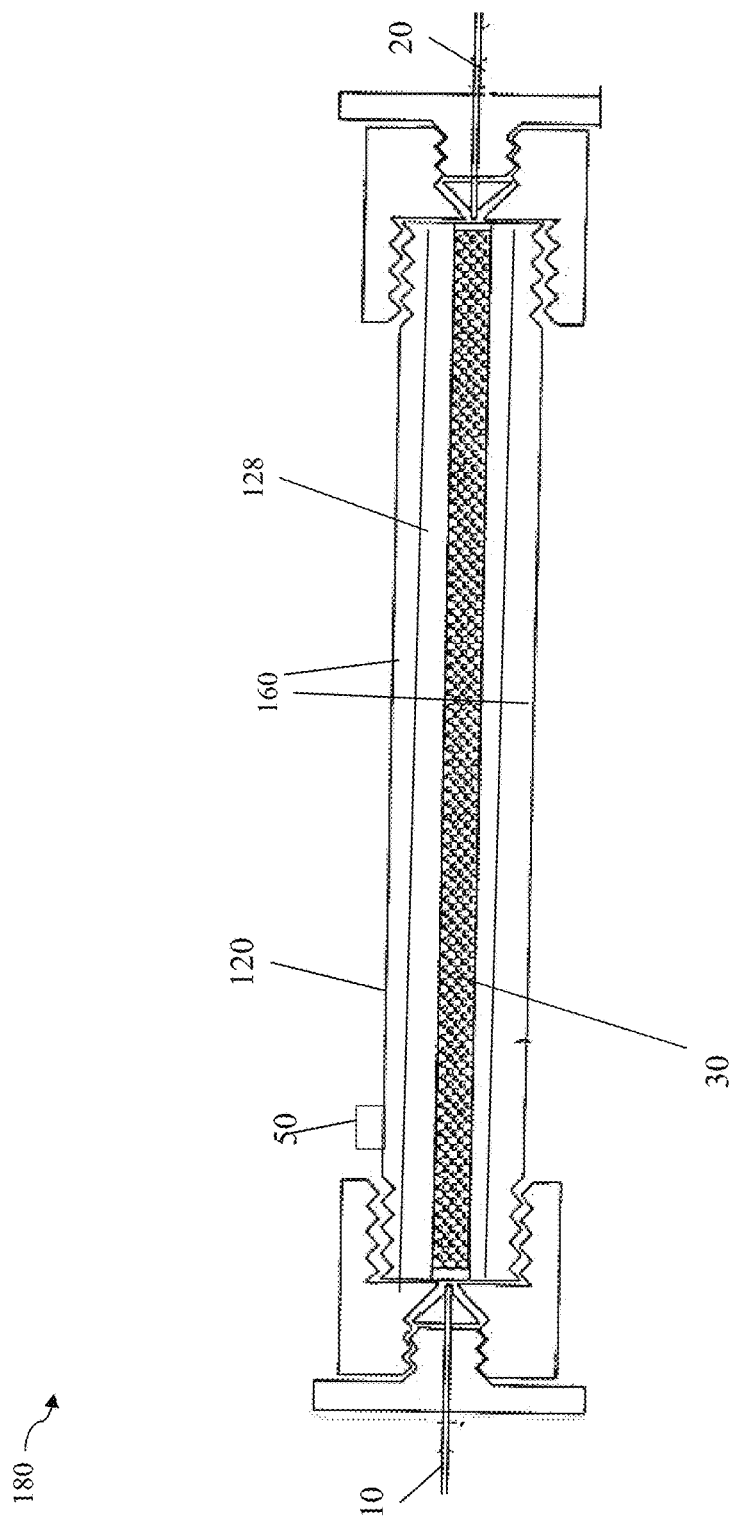

Referring to FIG. 4, shown is an example of another embodiment of a chromatography column in accordance with techniques herein. The embodiment of FIG. 4 may be used as the column 110 in the system of FIG. 1. FIG. 4 includes components similar to those of FIG. 3 where the insulation member or layer 160 is included as an integrated part or layer of the column. In the example 180 (as also in FIG. 3), the column may be characterized as including a first inner portion 128 (as described above in connection with FIG. 2) surrounded by a second outer portion forming the insulating layer 160. In the example 180 of FIG. 4, the insulating layer 160 may extend substantially the entire length of the inner portion 128. The insulating layer 160 may be formed as described above in connection with element 130 of FIG. 2.

When performing experiments using LC systems, it may be desirable to sometimes heat or increase the temperature of the mobile phase to be greater than ambient or air temperature. To this end, further exemplary embodiments are illustrated in connection with FIGS. 5A and 5B.

Referring to FIGS. 5A and 5B, shown are further example embodiments in which an active heating element may be positioned before the column to heat the mobile phase prior to the column inlet in accordance with techniques herein.

FIG. 5A illustrates an example 200 of components of the LC system. The example 200 includes a pump 202, injector 204, heater 206 and encasement or housing 201 enclosing the LC column in a manner similar to that as described above in connection with FIG. 2. The housing 201 may include through hole 250 having an exterior wall 220 functioning as the jacket 120 of FIG. 2. Element 230 may be the chamber forming the insulating layer as described above in connection with element 130 of FIG. 2. The heater 206 may be, for example, the ACQUITY Active Solvent heater provided by Waters Corporation. The heater 206 may, for example, be set at a desired set point temperature to heat the mobile phase having a flow path as represented by the arrows between the various components 202, 204, 206 and 201.

FIG. 5B is a further variation to that of FIG. 5A. The example 280 of FIG. 5B is similar to the example 200 of FIG. 5A with the difference that the heater 206 is included within the housing 201 in FIG. 5B.

It should be noted that element 201 may be, for example, a column heater compartment or oven into which the column is placed. The column heater may include appropriate airtight seals as described herein to which a vacuum pump may be connected (not shown) via through hole 250 as described above in connection with through hole 50 of FIG. 2. In such an arrangement, the column heater may apply additional heating, as may be needed, in addition to the active heating element represented by 206 for heating the mobile phase prior to entry into the column 128. Furthermore, an embodiment may use a column heater as described above in connection with FIG. 5A with or without use of the solvent heater 206. The column heater (such as represented by 201 in FIGS. 5A and 5B) may be, for example the Waters AQUITY UPLC® column heater.

In connection with the foregoing heater element 206 and/or embodiment where element 201 is a column heater, heating in connection with obtaining a desired set point may be performed using a feedback control (not illustrated) whereby the actual or observed temperature may be obtained, such as using one or more thermocouples, to provide feedback to electronic controls of the heating components (e.g., to increase/decrease amount of heat by controlling the heater based on whether the current temperature measured by the thermocouple is at the desired temperature set point, or within an acceptable threshold of such a set point). In an embodiment using the column heater, the column heater may be used to apply an additional source of heat to the column enclosed within 201 in an airtight manner. The additional source of heat provides for heating the column 128 via radiant heating from the surrounding environment. It should be noted that other suitable techniques may be used to also provide additional heat to the column 128 included within the housing 201 with the above-mentioned insulating member or layer 230 such as formed by the vacuum chamber between the outer wall of the column 128 and the wall 220 of the housing 201. For example, an optional heater or heating means may enclose or surround housing 201 which provides the ability to add radiant heat to compensate for potential non idealities in reaching true adiabatic conditions.

What will now be described are techniques that may be used in connection with performing an LC experiment during operation of an LC system to reduce the amount of time it takes to achieve steady state as described above with respect to measured axial thermal gradient whereby there will be substantially constant values for column inlet temperature $T_{in}$, column outlet temperature $T_{out}$ and the difference (e.g., within some accepted amount of measured threshold difference) between $T_{in}$ and $T_{out}$.

Techniques described in following paragraphs may use one or more independently controlled heaters in thermal contact with the column at various column positions. In some embodiments as described herein, a plurality of independently controlled heaters in thermal contact with the column at various column positions may be utilized. These independently controlled heaters may be used alone, or in combination with, other sources of heat that may be applied in connection with controlling the temperature of the column and liquid mobile phase passing therethrough.

Temperature is one parameter that may have a significant effect on the retention of an analyte. Temperature may alter, for example, the kinetics of adsorption and desorption between an analyte and the stationary phase or separation medium thereby affecting both the speed and selectivity of the separation. In performing LC experiments, it is important that the LC column achieve a steady state temperature in order to obtain reproducible results. Techniques described in following paragraphs provide for reducing the time needed to achieve such steady state with respect to column temperature. As described elsewhere herein, the steady state column temperature may be determined by having $T_{in}$ and $T_{out}$, and the difference therebetween (e.g., axial temperature gradient) be relatively or substantially constant.

Figure 6:
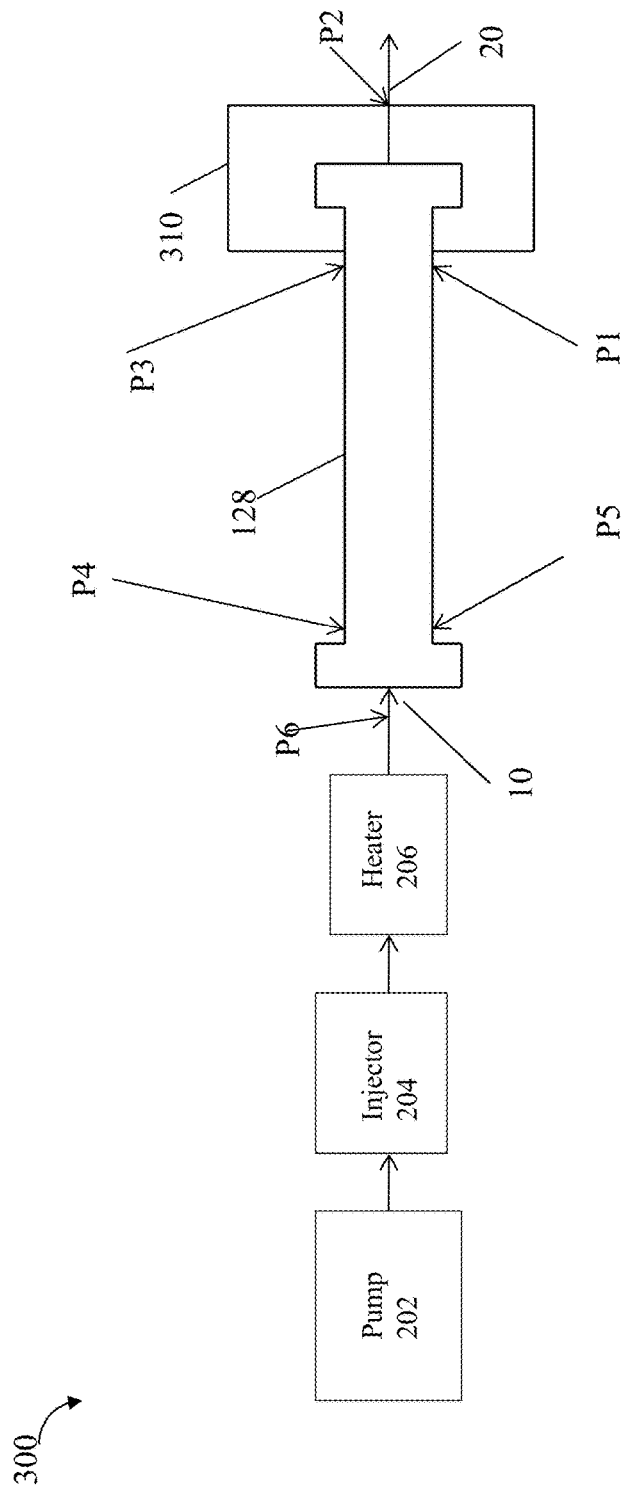

Referring to FIG. 6, shown is an example of an embodiment of components that may be used in connection with the techniques herein for reducing the amount of time required to achieve steady state as determined based on substantially constant measured values for $T_{in}$, $T_{out}$ and temperature difference between $T_{in}$ and $T_{out}$ (e.g., axial gradient that is substantially constant). The example 300 includes a pump 202, injector 204, heater 206, and uninsulated column 128 having inlet 10 and outlet 20 as described elsewhere herein. Additionally, the example 300 includes a heater 310 coupled to, and in thermal contact with, the column 128 at the column outlet 20. The column exit or outlet temperature $T_{out}$ may be measured, for example, by a thermocouple positioned at or near the column exit. Elements P1, P2 and P3 indicate exemplary positions where the thermocouple may be positioned to obtain the temperature measurement $T_{out}$. The heater 310 may be set, manually or through an automated control means (not illustrated), at a desired set point temperature. The observed actual temperature may be measured using the thermocouple and the heater 310 may be turned on/off or otherwise adjusted to increase or decrease an amount of heat from the heater 310 based on whether the measured temperature $T_{out}$ (e.g., such as from one of P1, P2 or P3) is at the desired set point value. As known in the art, a feedback technique such as using suitable electronic wiring, circuitry, and the like, may be used to automate control and operation of the heater 310. For example with reference back to FIG. 1, code executing on the computer 116 may provide a user interface by which a user may select and set a desired set point for $T_{out}$. The measured temperature $T_{out}$ may be provided to the computer system whereby code executing on the computer system may compare the measured $T_{out}$ to the desired set point value for $T_{out}$ and issue control signals to the heater 310 to appropriately control operation of the heater 310 in response to whether the measured $T_{out}$ is at the desired set point value for $T_{out}$.

$T_{in}$, the column inlet temperature as described above, may be measured in a manner similar to that as $T_{out}$. For example, a thermocouple may be used to measure $T_{in}$ at any suitable position at the column inlet such as represented by P4, P5 and P6. Based on the observed or measured values of $T_{in}$ and $T_{out}$ and determining a difference therebetween, an embodiment may determine when steady state has been reached as indicated by substantially constant measured values for $T_{in}$, $T_{out}$ and the axial thermal gradient or difference between $T_{in}$ and $T_{out}$.

The measurement of $T_{in}$ and $T_{out}$, control of the heater 310, and temperature set point selection for $T_{out}$ may be determined in using any suitable manual and/or automated technique as will be appreciated by those of ordinary skill in the art. For example, an embodiment may use automated techniques such as described above using control signals to control operation of the heater 310. Additionally, an embodiment may also determine the desired temperature set point for $T_{out}$ in an automated manner such as using an algorithm implemented by code executing on a processor that predicts the steady state column exit temperature based on a given $T_{in}$ and other parameters and uses this computed value of $T_{out}$ as the desired set point for $T_{out}$. The steady state column exit temperature may be determined algorithmically based on the particulars of an implementation. For example, a predicted steady state column exit temperature as a set point for $T_{out}$ may be determined based on/using, column dimensions (e.g., length and diameter), particle size, mobile phase composition (e.g., solvent), flow rate, column inlet temperature $T_{in}$, and thermal properties of the column assembly. For example, the following equation may be used in connection with automated techniques to automatically predict a desired $T_{out}$ (predicted column exit temperature) as a set point for steady state depending on the various parameters including a given $T_{in}$. For example, an embodiment may use a PID (proportional-integral-derivative) controller to drive the set temperature of $T_{out}$ to a steady state value based on a known or given $T_{in}$ and other system parameters. In this manner, such techniques may be used to determine and drive the system to steady state. As known in the art, a PID controller may be characterized as a generic control loop feedback mechanism (controller) as widely used in various type of control systems. The temperature increase in an adiabatic column that is heated via frictional heat can be predicted by the Equation:

$$\Delta T_L = (1 - \overline{\alpha T}) \frac{\Delta P}{\rho C_p} \quad \text{EQUATION A}$$

where $\Delta TL$ is the longitudinal temperature difference between column inlet and outlet (e.g., $T_{in}-T_{out}$), $\alpha$ is the thermal expansion coefficient of the mobile phase, $T$ is the mean temperature of the mobile phase, $\Delta P$ is the pressure drop across the column, $C_p$ is the heat capacity of the mobile phase at constant pressure, and $\overline{\alpha T}$ represents the average of a quantity $\Delta T$, and $\rho$ is the density of the mobile phase. The value $(1-\alpha T)$ is on the order of ⅔ (F Gritti and G Guiochon, *Anal. Chem.* 80 (2008) 5009). For example, using EQUATION A, an embodiment may use automated techniques to determine a predicted value for $T_{out}$ associated with steady state for a given or set $T_{in}$. Appropriate control signals may be sent to the heater/cooling unit 310 so that $T_{out}$ reaches and maintains (within some specified tolerance) its predicted steady state value. As different values for $T_{out}$ are desired based on different given values for $T_{in}$, such automated techniques may be used to determine and provide for adjusting $T_{out}$ (e.g., by controlling 310). More generally, EQUATION A may be used to determine particular pairs of values for $T_{in}$ and $T_{out}$ associated with a steady state. As described in more detail elsewhere herein, one or more heating and/or cooling units may be used to drive $T_{in}$ and/or $T_{out}$ to desired temperatures as determined using EQUATION A.

A method for calculating the predicted steady state column exit temperature based on the foregoing may be implemented, for example, using software executing on a processor such as of the computer 116 of FIG. 1. As described above, temperature control of the heater 310 may be obtained by adjusting or controlling the heater 310 via a feedback loop that monitors the column exit temperature and sends control signals to the heater 310 based on when a predicted desired set point for $T_{out}$ has been reached (e.g., when the measured column exit temperature $T_{out}$ is at or near (such as within a threshold amount of) the predicted value for $T_{out}$).

In connection with FIG. 6, it should be noted that the heater 206 may be optionally utilized so that an embodiment in accordance with techniques herein may only include heater 310 but not 206 as a solvent heater prior to entering the column 128. Additionally, in connection with FIG. 6, element 310 may be a heater or more generally a temperature control unit that provides heating and/or cooling.

As a variation to the embodiment of FIG. 6, the unit represented by 310 may be configured to be moveable or portable and readily positioned at other axial locations along the column 128 besides at the column exit or outlet as illustrated.

Figure 7:
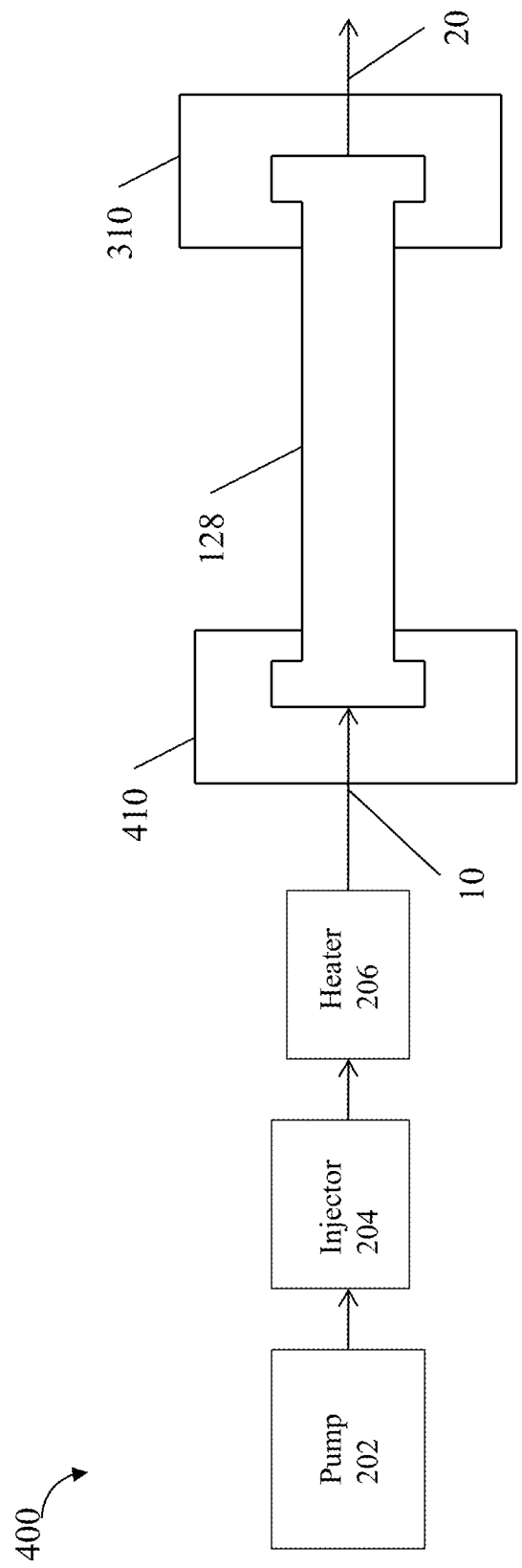

Referring to FIG. 7, shown is an example of another embodiment of components that may be used in connection with the techniques herein for reducing the amount of time required to achieve steady state as determined based on substantially constant values for $T_{in}$, $T_{out}$ and temperature difference between $T_{in}$ and $T_{out}$ (e.g., axial gradient that is substantially constant). The example 400 includes a pump 202, injector 204, heater 206, heater 310 and uninsulated column 128 having inlet 10 and outlet 20 as described above in connection with FIG. 6. Additionally, the example 400 includes a second heater 410 coupled to, and in thermal contact with, the column 128 at the column inlet 10. Element 410 may be similar to the heating and/or cooling unit represented by element 310 with the difference that 410 is located at the inlet of column 128 functioning to control $T_{in}$. Thus, in a manner similar to that as described above regarding $T_{out}$, $T_{in}$ may be set to a desired temperature set point and used as the set point for controlling heater 410. Heater 410 may be set, for example, via a manual and/or automated manner and the heater 410 may be controlled manually (e.g., user may turn on, off or otherwise adjust controls of the heater 410 based on observed Tin) or automatically (e.g., using a feedback technique with electronic temperature monitoring and control means to adjust the heater 410 based on observed or measured column inlet temperature $T_{in}$ and a desired set point $T_{in}$). Such temperature monitoring and control means may include use of a computer or processor having code executing thereon which obtains observed temperatures from temperature sensors (e.g., such as located at any of P1-P6 of FIG. 6), and determines appropriate control signals sent over electronic circuitry connected to appropriate ones of the heating/cooling or temperature control units to effect a desired temperature adjustment. The observed temperature(s) may be used to determine what control signals, if any, are sent to one or more of the temperature control unit(s) to achieve desired set point temperature(s) such as may be determined in accordance with EQUATION A.

Element 410 may be an independently controlled temperature control unit that provides heating and/or cooling. For example, $T_{in}$ may be selected as a desired set point and unit 410 may provide appropriate heating and/or cooling to achieve and maintain the desired set point for $T_{in}$. Using $T_{in}$ and the above-noted EQUATION A, a predicted desired set point for $T_{out}$ may be calculated and used as the desired set point for the unit 310. The units 310 and 410 may be independently controlled to achieve and maintain a different desired set point for each as may be used in an embodiment.

As another example of a use in connection with the embodiment 400 of FIG. 7 when performing an LC experiment, the heater 206 may not be utilized. Additionally, the unit 410 may have a desired temperature setting $T_{in}$ which is less than a desired temperature setting $T_{out}$ of unit 310. Unit 410 may function as a cooling unit to reduce temperature of the mobile phase to be less than ambient temperature and unit 310 may function as a heating unit to increase the temperature of the mobile phase to be greater than ambient temperature and also greater than $T_{in}$ (e.g., $T_{in}$<ambient temperature; $T_{out}$>ambient temperature, and $T_{in}$<$T_{out}$. As a further example, elements 410 and 310 may be cooling units having desired set points both of which are less than ambient temperature and also where the set point $T_{in}$ of 410 is less than the set point $T_{out}$ of 310 (e.g., $T_{in}$<ambient temperature; $T_{out}$<ambient temperature, and $T_{in}$<$T_{out}$). As yet a further example, elements 410 and 310 may be heating units having desired set points both of which are more than ambient temperature and also where the set point $T_{in}$ of 410 is less than the set point $T_{out}$ of 310 (e.g., $T_{in}$>ambient temperature; $T_{out}$>ambient temperature, and $T_{in}$<$T_{out}$).

More generally, an embodiment in accordance with techniques herein may include a plurality of heating and/or cooling units such as denoted by 310, 410 above at any location along the column axis in thermal contact with the column 128.

As will be appreciated by those skilled in the art and in connection with various examples described herein, EQUATION A may be used to determine and predict a desired steady state value for $T_{out}$ given a particular set of parameters including $T_{in}$. A heating/cooling unit 310 may then be controlled to provide for appropriately adjusting $T_{out}$ to be at a desired steady state predicted set point temperature based on EQUATION A. In a similar manner such as described in connection with FIG. 7, such techniques may be used to control operation of 410 thereby driving or adjusting $T_{in}$ to a desired predicted value such as based on a particular given $T_{out}$ value. More generally, the $\Delta T_L$ of EQUATION A represents the temperature difference between two temperatures in connection with steady state. As such, given EQUATION A and one of the two temperatures used to compute $\Delta T_L$, the second of the two temperatures may be predicted. As described above, $\Delta T_L$, the temperature difference, may be between $T_{in}$ and $T_{out}$ where either one may be known which is then used with EQUATION A to determine via calculation the second temperature (e.g., $T_{in}$ fixed or known and use EQUATION A to drive or determine $T_{out}$. Alternatively, $T_{out}$ may be fixed or known and may be used to with EQUATION A to determine a predicted $T_{in}$). More generally, the automated techniques and EQUATION A may be used with any two temperatures used to determine $\Delta T_L$ where one of the two temperatures may be given and used to predict the other second temperature in connection with achieving a desired steady state. An embodiment may control operation of 310 and/or 410 based on desired temperatures for experimentation.

Figure 8:
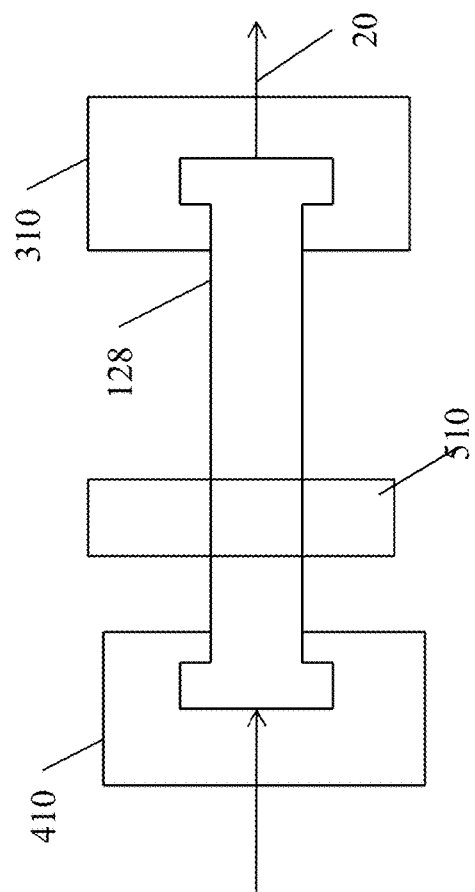

FIG. 8 is another example of such an embodiment. In the example 500, the components similarly numbered may be as described above in connection with FIG. 7. Additionally, a third unit 510 providing heating and/or cooling may be positioned along the axis of column 128 in thermal contact with the column 128. The units 310, 410 and/or 510 may be secured, coupled to, or more generally in thermal contact with, the column 128. In one embodiment, the units 310, 410 and/or 510 may be attached or secured to the column 128 using clamps or other suitable means. For example, in one embodiment, ends of the column 128 may be positioned within units represented by elements 310 and 410.

Based on the axial position or location on column 128 from the column inlet, element 510 may be considered as a unit for heating and/or cooling in a manner similar to 310 and/or 410. More generally, depending on the axial location or position of 510 along the column, the desired set point for 510 may be determined in accordance with EQUATION A. The temperature, $T_{intermediate}$, at or near location 510 may be measured using temperature sensing devices as described herein in connection with measuring an observed value for $T_{in}$ and/or $T_{out}$. Similar means may also be used to control and adjust heating/cooling unit 510 as described for 310 and/or 410. A set point for $T_{intermediate}$ may be determined, for example, based on a proportional temperature difference between $T_{in}$ and $T_{out}$ where such proportion is based on the distance or location of $T_{intermediate}$ with respect to locations in the axial direction along 128 of $T_{in}$ and $T_{out}$. For example, if 510 $T_{intermediate}$ is located midway or midpoint between $T_{in}$ and $T_{out}$ along 128, $T_{intermediate}$ may be determined as approximately $T_{in}+(\frac{1}{2} \Delta T_L)$ (e.g., also may be represented as $(T_{in}+T_{out}/2)$. Thus, the desired set point temperature for $T_{intermediate}$ may be estimated as a value between $T_{in}$ and $T_{out}$ which is proportional to the location or distance of $T_{intermediate}$ between the axial locations along column 128 where $T_{in}$ and $T_{out}$ are measured (e.g., column inlet and outlet).

The desired target or set point temperature of 510 may vary proportionally with the axial location of 510 on the column 128. Element 510 may be associated with an intermediate temperature, $T_{intermediate}$, and may be used in a manner similar to that as described herein with $T_{in}$ and/or $T_{out}$. For example, any one or more of 310, 410 and/or 510 may be adjusted in accordance with EQUATION A to achieve steady state. For example, $T_{in}$ may be known or given (whereby 410 may not be used or operated) and units 510 and/or 310 may be controlled to achieve desired set point temperatures based on EQUATION A. $T_{out}$ may be known or given (whereby 310 may not be used or operated) and units 510 and/or 410 may be controlled to achieve desired set point temperatures based on EQUATION A. As another example, in connection with conditions for a particular experiment, set point values for $T_{in}$, $T_{out}$ and $T_{intermediate}$ may be determined based on EQUATION A and units 410, 510 and/or 310 accordingly operated to achieve the desired set points values. Based on the above, an intermediate point $T_{intermediate}$ may be located on the chromatography column between the inlet and the outlet. The intermediate point of the chromatography column may be set to an intermediate temperature using unit 510 (e.g, prior to injecting a sample in connection with obtaining steady state). The intermediate temperature at the intermediate point may be between desired set point values for $T_{in}$ and $T_{out}$ (such as determined using EQUATION A). In one aspect, the desired intermediate temperature set point may be determined as a sum of $T_{in}$ and an approximated value where the approximated value is a temperature offset proportional to a distance of the intermediate point from the column inlet. In a similar manner, the desired intermediate temperature set point may be determined as a temperature offset with respect to $T_{out}$. This temperature offset may be an approximated value proportional to a distance of the intermediate point from the outlet.

Thus, the example 500 of FIG. 8 illustrates one possible implementation of techniques herein using a plurality of units providing heating and/or cooling. By adding thermal energy (or otherwise more generally using one or more auxiliary heating and/or cooling units as described herein) to various axial location points along a chromatographic column, thermal equilibrium may be obtained in less time than if the column were allowed to heat naturally via friction and other artifacts of the experiment providing heat without use of the additional units such as 210, 310, 410, and/or 510.

It should be noted that each of the exemplary embodiments of FIGS. 6, 7, and 8 as well as other embodiments such as described above (e.g., with additional heaters in thermal contact with the column and/or placement of heaters in different axial positions along the column) may include an insulating jacket surrounding the column and heaters.

As described above with reference again to FIG. 8, an embodiment may use elements 410, 510 and 310 in connection with, respectively, $T_{in}$, $T_{intermediate}$, and $T_{out}$. As a variation to this, an embodiment may, for example, omit use of $T_{out}$ and 310 and rather include and use only 410 and 510 respectively with $T_{in}$ and $T_{intermediate}$ in connection with techniques herein. As yet another variation, an embodiment may, for example, omit use of $T_{in}$ and 410 and rather include and use only 510 and 310 respectively, with $T_{intermediate}$ and $T_{out}$ in connection with techniques herein.

As yet another variation, rather than have 510 represent a heating/cooling unit which may be controlled or adjusted, an embodiment may alternatively just measure or monitor one or more intermediate temperatures at one or more points between $T_{in}$ and $T_{out}$ along column 128 as part of feedback control processing. However, in this case, the one or more intermediate temperatures measured may be used to modulate or control the units 410 and/or 310 based on a measured intermediate temperature. The intermediate temperature(s) may be used as the monitored or observed temperatures in connection with feedback techniques rather than use of measured or observed values for $T_{in}$ and/or $T_{out}$ at respective column endpoints. In this manner, an intermediate temperature may be used as a monitored or observed temperature to adjust $T_{in}$ and/or $T_{out}$ by controlling operation of 410 and/or 310 until the intermediate temperature observed is about at its desired set point value (obtained through adjustments made using units 410 and/or 310). To further illustrate, an embodiment may measure $T_{intermediate}$ to determine whether the measured $T_{intermediate}$ is at a desired value or set point. Accordingly, adjustments may be made to unit 410 until the measured $T_{intermediate}$ is at its desired set point. Thus, $T_{intermediate}$ may be used to control or adjust 410 rather than make such adjustments to 410 based on a temperature measured at $T_{in}$ (endpoint of 128 at or near the location of 410 such as illustrated in FIG. 6).

Figure 9:
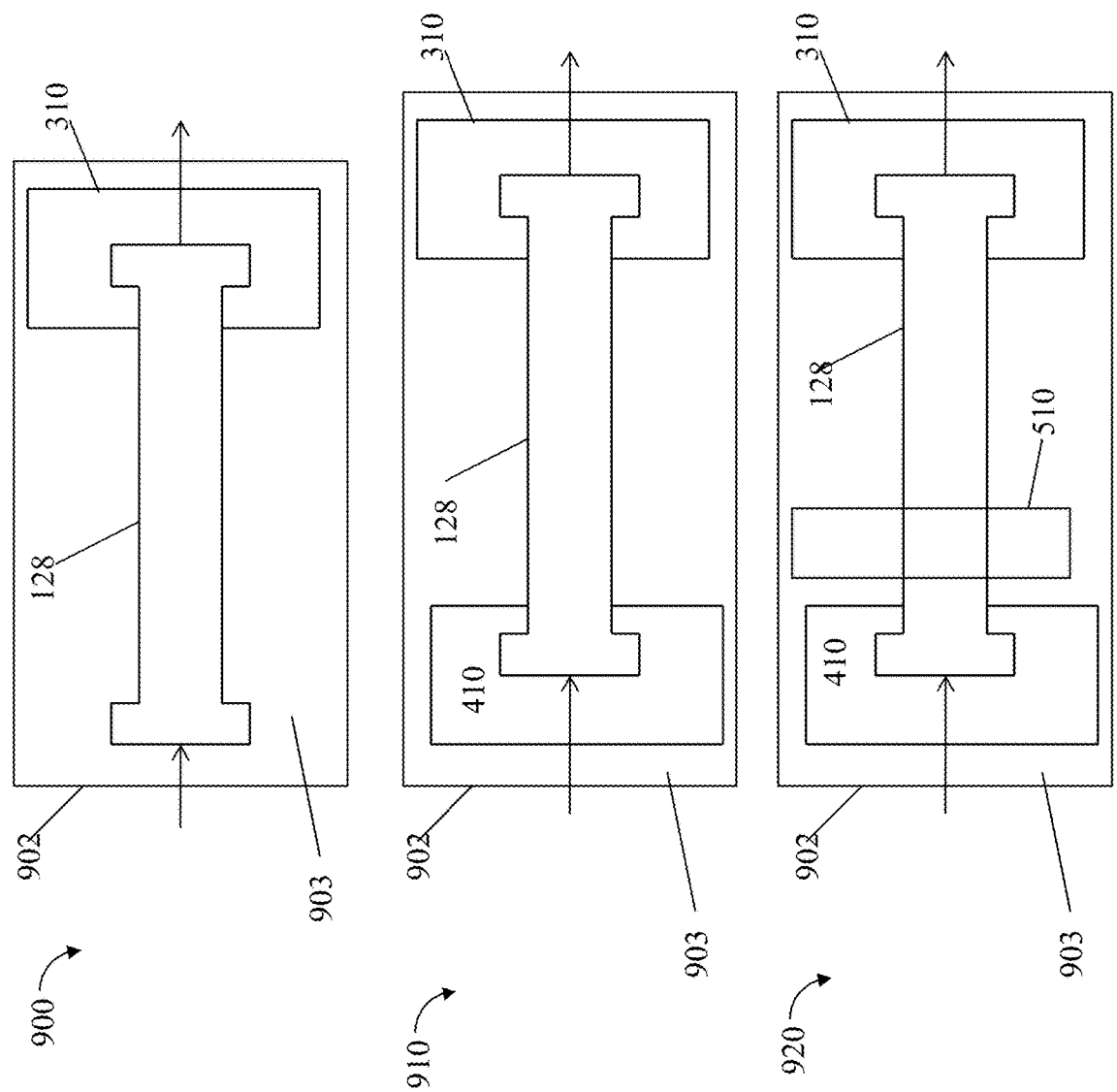

Referring to FIG. 9, shown are examples of the embodiments from FIGS. 6, 7 and 8 with the addition of a thermally insulating layer. Element 902 may represent a thermally insulating jacket in each of 900, 910 and 920. The example 900 is an illustration of the column embodiment of FIG. 6 in the surrounding jacket 902. The example 910 is an illustration of the column embodiment of FIG. 7 in the surrounding jacket 902. The example 920 is an illustration of the column embodiment of FIG. 6 in the surrounding jacket 902. The jacket 902 may provide thermal insulation by reducing heat loss due to convective air currents. In one embodiment, the jacket 902 may provide sufficient insulation preventing thermal conductivity between the column (and its contents) and ambient temperature such as of the environment outside of or surrounding the jacket 902.

The jacket 902 may be made from polystyrene foam (Styrofoam®), or more generally, any material exhibiting low thermal conductivity to act as an insulating member. Polymers such as polymethacrylate, silicone, urethane, polyolefins, polyamide, polysulfone, polyethyramide, polycarbonate, rubber, polyester, polyfluoroelastomers and polyethylene terephthalate, and the like, may also be used to form the jacket 902.

Additionally, ceramics E.g., such as aerogels), fibrous materials (e.g., such as methylcellulose and fiberglass) and the like, may also be used to form the jacket 902. Although various thermal insulating materials have been set forth in the foregoing illustrative embodiments as to materials that may be used to form jacket 902, any various suitable thermally insulting materials known in the art may be utilized. It will be appreciated that such materials may be so shaped as to insulate the area around the chromatography column to create a controlled air space or chamber so as to prevent or minimize a radial thermal gradient within the column. Furthermore, although such materials may be illustrated as immediately surrounding the column, such materials may also be integrated into the column itself, for example, such as used to form the column outer walls.

As another variation, the jacket 902 may be made of steel or metal as described above in connection with FIG. 2 so that the insulating layer or member is not the jacket 902 itself but rather the airspace 903 surrounding the uninsulated column 128 (e.g., between the column 128 and the surrounding jacket 902). In this case, element 903 may be the chamber or space, such as the vacuum chamber, forming the insulating layer and may be formed using any of the techniques, gases (e.g., insert gas, atmospheric gas), and the like, as described elsewhere herein such as in connection with FIG. 2. In one embodiment, the chamber or airspace 903 between the column 128 and the jacket 902 (e.g., surrounding the column 128) may be at ambient pressure and aerogel particles may be included in the area 903 to provide insulation. Alternatively, the airspace 903 including the aerogel particular may be form a vacuum chamber having a pressure less than ambient pressure. Examples of such pressures are described elsewhere herein. As a variation to the area 903 including aerogel particles, the column 128 may be placed in a molded aerogel component. The molded aerogel may surround the column and may be formed, for example, from two separately molded halves or portions which, when placed together, form a desired cavity approximating the shape of the column. The foregoing two molded aerogel portions may be fitted together as part of assembly with the column inserted into the formed cavity. The foregoing embodiments using molded aerogel or aerogel particles in a chamber may be used as an means of insulation in connection with any of the embodiments of the column described herein such as, for example, using one or more additional heating/cooling units.

Figure 10:
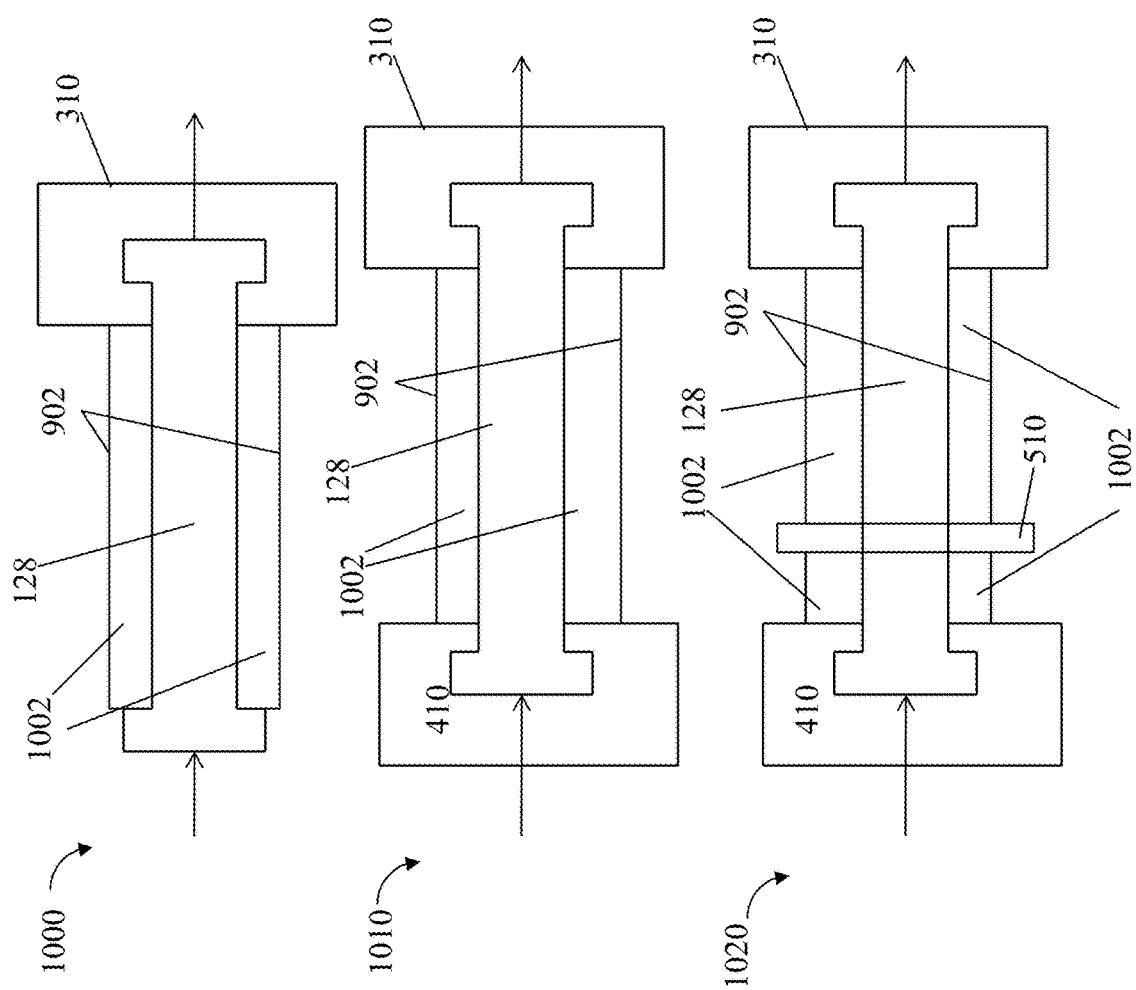

Referring to FIG. 10, shown are examples of the embodiments from FIGS. 6, 7 and 8 with the addition of a thermally insulating layer 1002. In the examples 1000, 1010 and 1020 of FIG. 10, the insulating layer 1002 may be an integral component of the column 128 such as described elsewhere herein in connection with FIGS. 3 and 4. In the examples 1000, 1010 and 1020, the insulating layer 1002 may be formed from any of the materials of the jacket 902 as described above. As a further variation, the insulating layer 1002 may be formed as a layer between a surrounding outer jacket 902 forming the outer walls of the combination of the column 128 and insulating layer 1002. The jacket 902 in this case may be made of steel, titanium, or other suitable material such as described elsewhere herein in connection with FIG. 2 and the insulating layer 1002 may be the chamber or space, such as the vacuum chamber, forming the insulating layer using any of the techniques, gases (e.g., insert gas, atmospheric gas), and the like, as described elsewhere herein such as in connection with FIG. 2 (and above in FIG. 9).

In connection with the example 1020, it should be noted that the unit 510 that performs heating and/or cooling should have sufficient thermal contact with the uninsulated column 128. For example, the insulating layer 1002 is illustrated as being formed around the unit 510 in areas bounded by or between, for example, units 410 and 510 and bounded by, or between, units 510 and 310.

In connection with embodiments described herein, such as with FIGS. 9 and 10, utilizing an insulating layer and/or jacket, it will be appreciated by those of ordinary skill in the art that the column inlet temperature, $T_{in}$ and column outlet temperature, $T_{out}$, may be measured by placement of various thermocouples in thermal contact with the uninsulated column 128 such as between any insulating layer and the column 128.

Axial control of column temperature as may be achieved using embodiments described herein such as in connection with FIGS. 6-10 may provide additional benefits. For example, axial control of temperature such as by control and selection of $T_{in}$ and $T_{out}$ may facilitate reproducibility of experimental conditions and chromatographic methods.

Such techniques may provide for reproducibility of experimental conditions using columns having similar properties as well as different properties. For example, a typical HPLC column with a mean particle size of 5 microns generates less heat than a column of equivalent dimensions using 1.7 micron size particles. Without use of the techniques herein, the resulting thermal gradient during experiments may be different on the two columns resulting in differences in experimental data obtained using the two columns. The techniques herein may be used with the two columns—each using a different size particle—to create identical thermal gradients for the two columns.

As another example, one way to increase throughput in chromatography is to operate at a faster flow rate. It may not be desired or expected to have an increased flow rate affect chromatographic selectivity. However, the thermal gradients across two columns would not be identical where the two columns have the same properties (e.g., dimensions, particle size, etc. affecting the experiment) and where each of the two columns has a different flow rate (e.g., since the frictional heat generated varies with, and is directly proportional to, the flow rate of the mobile phase). In experiments where the chromatographic selectivity (e.g., distance between peaks of eluting analytes) is altered with the changing flow rate, the axial thermal gradient may be altered so that the two experiments using the different flow rates provide similar selectivity. As known in the art, chromatographic selectivity (also referred to as a separation factor or relative retention ratio) is a measure of the time or distance between the maxima of two peaks. The chromatographic selectivity may be represented as K2/K1 where K1 is the retention factor of the first peak and K2 is the retention factor of the second peak, If K2/K1=1, then the peaks have the same retention and co-elute.

As another advantage, adding one Or more independently controlled heaters along the column body such as described above may reduce overall costs when compared to other alternatives such as use of a column heater, In connection with embodiments as described herein such as using a vacuum insulating layer or chamber surrounding the LC column, true adiabatic conditions may be approached to minimize radial thermal gradients and eliminate or minimize convective heat loss.

In connection with techniques herein, the inventors performed experiments that will now be described. A 2.33 100 mm Waters ACQUITY BEH C18 1.7 μm column was connected to a Waters ACQUITY™ UPLC instrument. 0.5 microliters of a sample containing the following 5 components: (1) 0.046 mg/mL thiourea; (2) 0.080 mg/mL dodecanophenone; (3) 0.1 mg/mL tetradecanophenone; (4) 0.10 mg/mL hexadecanophenone; and (5) 0.483 mg/mL di-n-decyl phthalate, was injected onto the column using a mobile phase of acetonitrile. Analyses were made using the following flow rates: 0.45, 0.50, 0.55, 0.65, 0.75, 0.85, 0.95, 1.05, 1.10, 1.15, and 1.20 mL/minute. The column was thermally equilibrated between changes in flow rate by monitoring repeat injections of the test probes until retention time reproducibility was achieved. Detection was by UV at 240 nm.

The vacuum system used in the experiment was a Pfeiffer Vacuum TSH 071E Turbomolecular Drag Pumping Station, which included the following standard components: a Pfieffer-Balzers TMH-071P Turbomolecular Drag Pump, with DN-63-ISO inlet flange and comes standard with a solid-state frequency converter, and electronic controls. A dual-stage, high-performance rotary vane pump with a pumping speed of 2.5 m$^3$/h from Pfeiffer (Duo 2.5 model PKD41707) was used to bring the vacuum quickly to ~$10^{-2}$ torr before starting the turbo pump. The vacuum chamber for the column and the connections to the vacuum system were constructed from MDC Vacuum Products (Hayward, Calif.) 304 stainless steel tubing and seals (Viton® or Buna-N® O-rings) rated to $10^{-8}$ torr. For vacuum reading between atmosphere to $10^{-2}$ mbar/Torr an Edwards active pirani gauge part number D02177000 APG-1-NW16 ST/ST was used. For vacuum readings between $10^{-3}$ to $10^{-8}$ mbar/Torr an Edwards active Inverted Magnetron Gauge part number D14641000 AIM-S-NW25 was used. The vacuum readings were taken as close (~4" away) from the column vacuum chamber.

Chromatographic performance was evaluated for columns under four different environments: (A) Isothermal: The column was placed in a re-circulating water bath (RTE-111, Thermo NESLAB) maintained at 25 C; (B) Still air: The column was placed inside a box of approximately 20"×33"×34" to minimize convection in the surrounding air; (C) Insulated with aerogel: Column was placed inside a chamber filled with granular aerogel from United Nuclear Scientific (Laingsburg, Mich.); (D) The column was jacketed in a vacuum of 3×$10^{-5}$ torr using a roughing pump and a diffusion pump.

Figure 11:
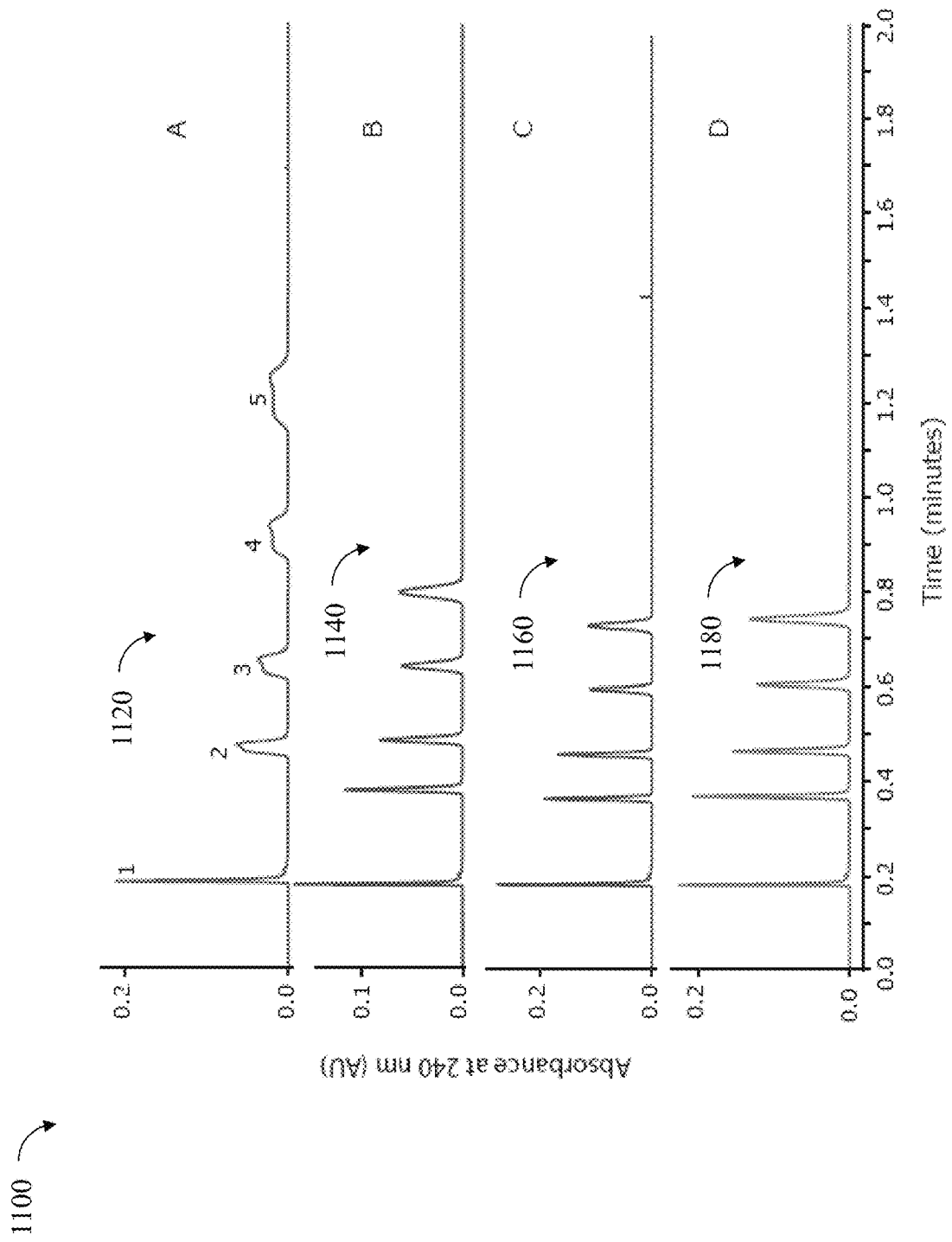
FIG. 11 is an example illustrating chromatograms from test results performed by the inventors in accordance with testing different environments.

Referring to FIG. 11, shown are chromatogram of the resulting separations for the above-mentioned four testing environments (A)-(D). The example 1100 includes 4 sets of chromatographic data obtained for a flow rate of 1.2 mL/minute. Element 1120 represents the chromatogram obtained for testing environment condition (A) for isothermal conditions where the column was placed in a re-circulating water bath (RTE-111, Thermo NESLAB) maintained at 25 C. Element 1140 represents the chromatogram obtained for testing environment condition (B) using still air where the column was placed inside a box of approximately 20"×33"×34" to minimize convection in the surrounding air. Element 1160 represents the chromatogram obtained for testing environment condition (C) where insulation was provided using aerogel where, as noted above, the column was placed inside a chamber filled with granular aerogel from United Nuclear Scientific (Laingsburg, Mich.). Element 1180 represents the chromatogram obtained for testing environment condition (D) whereby the column was jacketed in a vacuum of 3×$10^{-5}$ torr using a roughing pump and a diffusion pump. In connection with the chromatograms of 1100, the X axis of each denotes time, in minutes. In this example, the detector was a UV absorbance detector so that the detection units on the Y axis represent absorbance at 240 nm (AU). Each of the chromatograms 1120, 1140, 1160 and 1180 includes 5 peaks denoted 1-5 which respectively correspond to peaks for the 5 components of the sample as described above.

Shown below is a table illustrating the plate count for Peak (4) corresponding to hexanophenone, at the different flow rates. Results show that as flow rate increases, the plate count is highest in the cases where the column is at near adiabatic conditions.

| Flow Rate (mL/min) | (A) Isothermal | (B) Still air | (C) Insulated | (D) Vacuum |
|---|---|---|---|---|
| 0.45 | 25,536 | 25,045 | 27,160 | 27,227 |
| 0.50 | 22,598 | 22,829 | 26,108 | 26,892 |
| 0.55 | 19,175 | 20,908 | 24,956 | 26,382 |
| 0.65 | 12,733 | 16,954 | 22,756 | 25,518 |
| 0.75 | 7,997 | 13,492 | 20,747 | 23,607 |

-continued

| Flow Rate (mL/min) | (A) Isothermal | (B) Still air | (C) Insulated | (D) Vacuum |
|---|---|---|---|---|
| 0.85 | 5,099 | 10,866 | 19,014 | 22,104 |
| 0.95 | 3,389 | 8,926 | 17,386 | 20,489 |
| 1.05 | 2,357 | 7,386 | 15,875 | 18,898 |
| 1.15 | 1,715 | 6,259 | 14,567 | 17,098 |
| 1.20 | 1,478 | 5,839 | 14,095 | 16,371 |

Described in following paragraphs are additional embodiments of a vacuum insulated jacket, as well as a vacuum environment or chamber, in accordance with techniques herein. In at least some embodiments using a vacuum insulated jacket, such as illustrated in subsequent figures and described in following paragraphs, a chromatography column heater or oven (e.g., such as illustrated in FIG. 5B) may be omitted due to the high level of adiabatic conditions achieved with minimal heat loss from the chromatography column. However, such an embodiment may optionally include a preheater such as an active heating element as described in more detail below. Such a preheater is described below in connection with FIG. 12 and may also be generally known as an in-line solvent preheater located upstream from the column and its controlled thermal environment. As also described below, such a preheater may be optionally used in connection with subsequent embodiments of a vacuum insulated jacket, vacuum environment chamber or environment (e.g., as in FIGS. 13, 14, 15, 16, 17, and 18).

Figure 12:
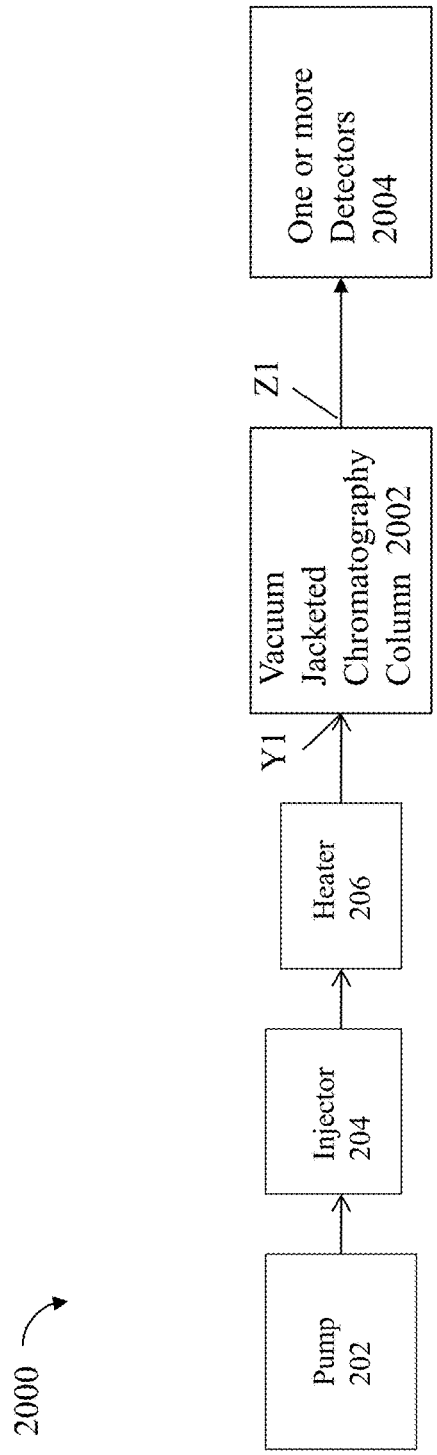
FIG. 12 is an example illustrating components that may be used in an embodiment in accordance with techniques herein.

Referring to FIG. 12, shown is a further example embodiment 2000 in which a heating element, also referred to herein as a preheater, may be positioned before the chromatography column to heat the mobile phase prior to the column inlet in accordance with techniques herein. Such a preheater may be external with respect to the chromatography column or chromatography module, chamber, enclosure, and the like, including the column. Although in the example 2000 a preheater 2006 may be used to heat the mobile phase prior to entry into the column, the example 2000 does not use a heater to heat ambient air surrounding the vacuum insulated jacket (e.g. such as may be done in a closed environment, such as a column oven or compartment, described in more detail below).

The example 2000 includes a pump 202, injector 204, preheater 2006, a vacuum jacketed chromatography column 2002, and one or more detectors 2004. Generally, elements 202, 204 and 2006 of FIG. 12 may be respectively similar, for example, to elements 202, 204 and 206 as described in connection with FIG. 5A and elsewhere herein. The preheater 2006 may be characterized as a preheater or an in-line solvent preheater (as noted above) that preheats the eluent or mobile phase prior to entry into the vacuum jacketed chromatography column 2002.

The preheater 2006 may be, for example, the ACQUITY Active Solvent heater provided by Waters Corporation. The preheater 2006 may, for example, be set at a desired set point temperature to heat the mobile phase having a flow path as represented by the arrows between the various components 202, 204, 2006, 2002 and 2004. The preheater 2006 may be set, manually or through an automated control means (not illustrated), at a desired set point temperature. For example, in at least one embodiment, the preheater 2006 may have a target set point temperature and a temperature sensor may be placed within 2006 to obtain an observed temperature within 2006 (e.g., such as ambient or air temperature within 2006). The observed actual temperature within 2006 may be measured using a thermocouple or other suitable device known in the art, and the preheater 2006 may be turned on/off or otherwise adjusted to increase or decrease an amount of heat from the preheater 2006 based on whether the measured temperature within 2006 is at the target set point value. Temperature monitoring and control of preheater 2006 may be performed in an automated manner using feedback and control signals with a computer, such as described elsewhere herein and known in the art. In such an embodiment, the temperature sensor (used to obtain the observed or measured temperature that drives 2006 to its current target set point temperature) may be placed generally in any suitable location within 2006 or may, for example, measure the temperature of the mobile phase at the outlet of the preheater 2006 prior to entry into 2002.

Element 2002 may be a vacuum jacketed chromatography column such as one of many different embodiments described in subsequent paragraphs and figures. Element 2004 may denote one or more suitable detectors that may be coupled to, or may interface with, the chromatography column outlet of 2002. Non-limiting examples of suitable detectors are described, for example, in connection with element 112 of FIG. 1. Examples of suitable detectors 2004 may include, for example, a UV absorbance detector, an evaporative light scattering detector, a mass spectrometer, an ion mobility spectrometer, and the like.

Additionally, the example 2000 omits use of a column heater, or second heater included in a closed environment, such as a chromatography column oven or compartment, in which both 2002 and the second heater would be placed. Such a closed environment may be an insulated chamber, compartment, enclosure, oven, and the like (e.g., see element 201 of FIG. 5B), and would include both 2002 and a second separate heater used as the column heater. As known in the art, the purpose of such a closed insulated environment, such as a column oven, is to provide for heating a chromatography column and maintaining steady state heated conditions in order to compensate for heat loss or transfer from the chromatography column that typically occurs during an experiment. However, as illustrated in the example 2000, no such closed environment with column heater is used. Use of such a closed environment including a second column heater and the chromatography column may not be needed in embodiments of the vacuum jacketed column 2002 described in following paragraphs and figures since the vacuum jacketing provides for sufficient reduction and elimination of heat loss. In this manner, the vacuum jacketed column embodiments described in following paragraphs avoid or minimize heat loss thereby removing the need to use the second column heater in the closed environment surrounding the column. In such an embodiment, a separate column module (including the column and column heater in a separate closed system, compartment, or module) may be omitted. In other words, a separate module or closed environment such as 201 in FIG. 5B is no longer needed. Furthermore, use of a preheater such as 2006 of FIG. 12, is also optional depending on that particular system requirements and applications.

Removal of the column heater and closed environment (e.g., column oven) as just described provides additional flexibility in connection with placement and possible integration of the vacuum jacketed column 2002 with other components. For example, in at least one embodiment, the vacuum jacketed chromatography column 2002 may be included as an integrated component with a detector. In such an embodiment, a single component may include both the vacuum jacketed column and detector. As another example, in at least one embodiment, the vacuum jacketed chromatography column 2002 may be included as an integrated component with an injector (e.g., such as in embodiments where the preheater 2006 is not needed). In such an embodiment, a single component may include both the vacuum jacketed column and injector. Such a single component including both the vacuum jacketed column and injector may be used, for example, in systems also including multiple detectors (e.g., ion mobility spectrometer and mass spectrometer) used in a sequence in connection with an experiment.

As another example, in at least one embodiment, the vacuum jacketed chromatography column 2002 may be included as an integrated component with the preheater 2006. In such an embodiment, a single component may include both the vacuum jacketed column and the preheater 2006. It should be noted that such a single component may be contrasted with a column oven since the single component would not include any additional insulation and would not be a closed environment surrounding the column in which the closed environment is sealed and insulated in order to heat the closed environment surrounding the column.

In at least one embodiment, temperature control and sensing may be performed such as to control steady state conditions of 2002. Generally, in at least a first embodiment, the preheater 2006 may be controlled or driven by whether the observed temperature at the column outlet $T_{out}$ (such as denoted by Z1) is at a desired set point. Alternatively, in at least a second embodiment, the preheater 2006 may be controlled or driven by whether the observed ambient or air temperature within the preheater 2006 is at a desired set point. As yet another alternative in at least a third embodiment, the preheater 2006 may be controlled or driven by whether the observed temperature of the mobile phase at $T_{in}$, at the column inlet (as denoted by Y1) is at a desired set point.

In an embodiment such as the one noted above where the preheater 2006 is driven by observed temperature at the column outlet $T_{out}$, a temperature sensor may obtain an observed temperature at the column outlet $T_{out}$ such as denoted by Zl. It may be desirable to drive $T_{out}$ to a desired set point by adjusting or controlling the preheater 2006 via a feedback loop that monitors the column exit temperature and sends control signals to the preheater 2006 based on whether a desired set point for $T_{out}$ has been reached (e.g., when the measured column exit temperature $T_{out}$ is at or near (such as within a threshold amount of) a desired set point or target temperature). The observed actual temperature $T_{out}$ may be measured using a thermocouple or other suitable device known in the art, and the preheater 2006 may be turned on/off or otherwise adjusted to increase or decrease an amount of heat from the preheater 2006 based on whether the measured temperature Tout is at the desired set point. Such control signals provided to preheater 2006 may, for example, maintain or increase a current level of heating provided by 2006 until $T_{out}$ is at or near (such as within a threshold amount of) a desired set point or target temperature. Once $T_{out}$ reaches the desired set point, control signals may be sent to the preheater 2006 to turn off or lower the current heating level (e.g., under the assumption that the vacuum jacketed column is an embodiment as described in following paragraphs that greatly reduces or minimizes heat loss).

Generally, such control signals provided to preheater 2006 may, for example, suitably adjust (increase or decrease) a current level of heat or temperature in order for $T_{out}$ to reach its desired set point. For example, if $T_{out}$ is below a desired set point (e.g., below set point by a specified tolerance), control signals may be sent to preheater 2006 to maintain or relatively increase its temperature/current level of heating thereby increasing the amount of heat relative to a current level. If $T_{out}$ is above a desired set point (e.g., exceeds set point by a specified tolerance), control signals may be sent to preheater 2006 to turn off or relatively decrease its temperature thereby decreasing the amount of heat relative to a current level. Such control signals and feedback may be implemented, for example, using software executing on a processor such as of the computer 116 of FIG. 1. For example with reference back to FIG. 1, code executing on the computer 116 may provide a user interface by which a user may select and set a desired set point for $T_{out}$. The measured temperature $T_{out}$ may be provided to the computer system whereby code executing on the computer system may compare the measured $T_{out}$ to the desired set point value for $T_{out}$ and issue control signals to the preheater 2006 to appropriately control operation of the preheater 2006 in response to whether the measured $T_{out}$ is at the desired set point value for $T_{out}$. In a similar manner to that just described for an embodiment where $T_{out}$ is measured and drives the preheater 2006, alternatively, the preheater 2006 may be driven by whether the observed ambient or air temperature within the preheater 2006 is at a desired set point, or may be driven by whether an observed temperature of the mobile phase at $T_{in}$, at the column inlet is at a desired set point.

In at least one embodiment in accordance with techniques herein, it may be desirable to have $T_{out}$ be at a desired set point (e.g., 90 degrees Celsius) as noted above whereby $T_{out}$ is the point at which an observed or measured temperature is obtained and used to drive the preheater 2006 to the desired set point). In connection with achieving conditions whereby $T_{out}$ has an observed temperature of the desired set point (e.g., 90 degrees Celsius), the preheater 2006 may be initially set higher than the desired set point (e.g., set point higher than 90 degrees Celsius, such as 100 degrees Celsius) in order to accelerate heating of the mobile phase such as may be measured at $T_{out}$ (whereby $T_{out}$ drives the preheater 2006 to its desired set point). Once $T_{out}$ reaches the desired set point (e.g., reaches 90 degrees Celsius) control signals may be sent to turn off or reduce the current temperature/level of heating provided by preheater 2006. For example, once $T_{out}$ reaches the desired set point, control signals may be sent to reduce the current set point of the preheater 2006 to the desired set point. In this manner, an embodiment may achieve the desired set point (e.g., 90 degrees Celsius) in an accelerated manner. In a similar manner, achieving desired conditions using an accelerated or initially higher than desired set point for preheater 2006 may be performed using the observed ambient or air temperature within the preheater 2006 and associated set point, or using the observed temperature of the mobile phase at $T_{in}$ and associated set point.

What will now be described are various embodiments of vacuum jacketed chromatography columns (e.g., FIGS. 13, 14, 15, 16 and 18) that may be used as element 2002 in the example 2000. Additionally, also described below in connection with FIG. 17 is an embodiment vacuum chamber (including a chromatography column) that may be used as element 2002 in the example 2000.

Figure 13:
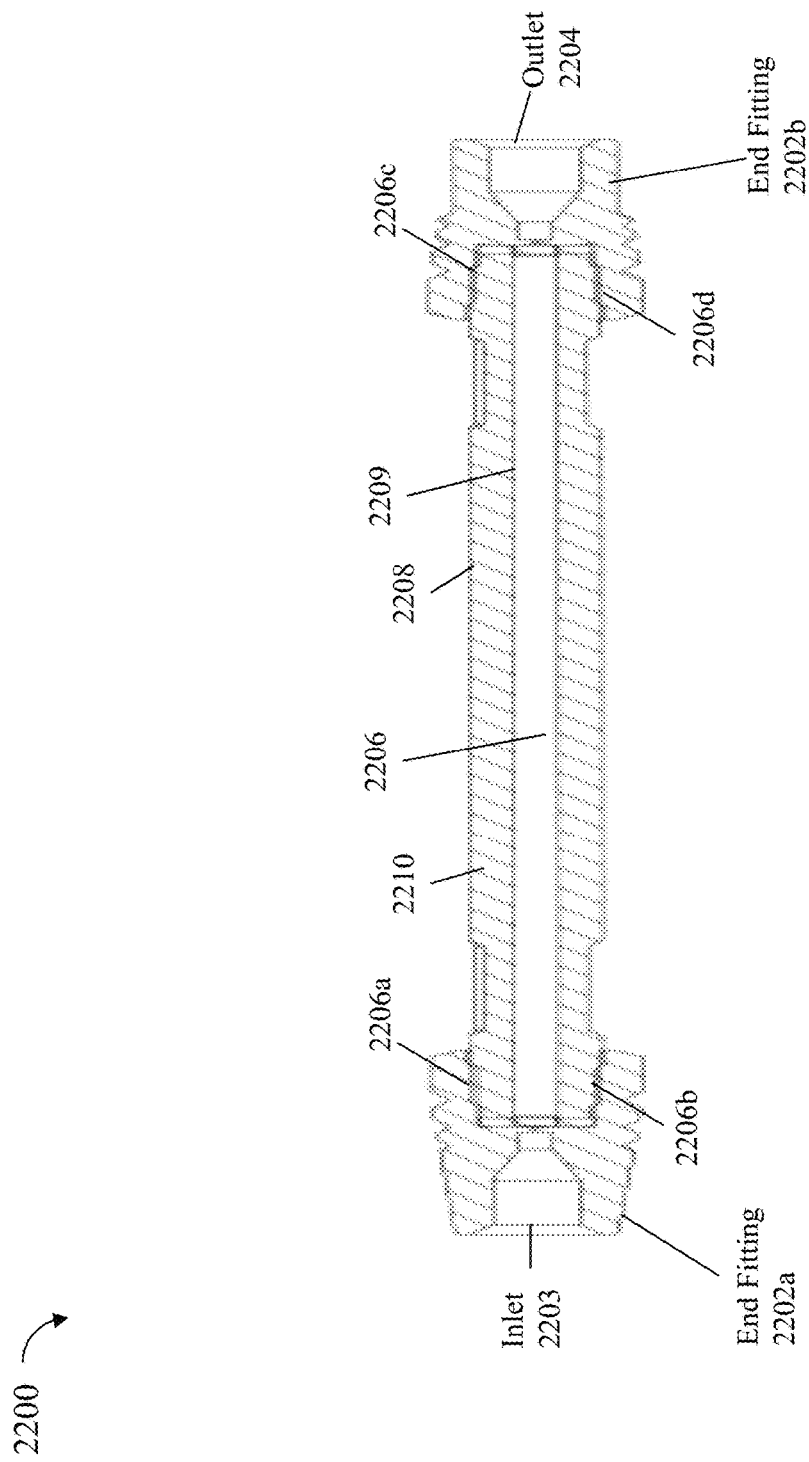
FIGS. 13, 14, 15, 16 and 18 are examples of vacuum jacketed chromatography columns that may be used in connection with FIG. 12.

Referring to FIG. 13, shown is an example 2200 illustrating a cross sectional view of chromatography column as may be used in an embodiment in accordance with techniques herein. The example 2200 is merely one example of a column that may be used and is illustrated in 2200 for reference purpose in connection with subsequent figures.

The column of 2200 has an inlet 2203, where the mobile phase or flow path enters the column, and an outlet 2204 from which the mobile phase or flow path exits the column. Also illustrated are end fittings 2202a and 2202b and the column body 2210. Element 2206 denotes the inside tubing through which the fluid path flows through the column. In at least one embodiment of 2200, the end fittings 2202a-b may attach to the body 2210 by means of threaded surfaces 2206a-d whereby the end fittings 2202a-b screw onto body 2210. In particular, elements 2206a-d denote surfaces of the body 2210 in contact with surfaces of the end fittings 2202a-b where such contact surfaces (of 2202a-b and 2210) are threaded. Element 2208 may denote the outer wall of the column. Element 2209 may denote the inner wall of the column.

It should be noted that in FIG. 13 and embodiments described in following paragraphs and figures, the column illustrated does not include column packing material (for simplified illustration).

Figure 14:
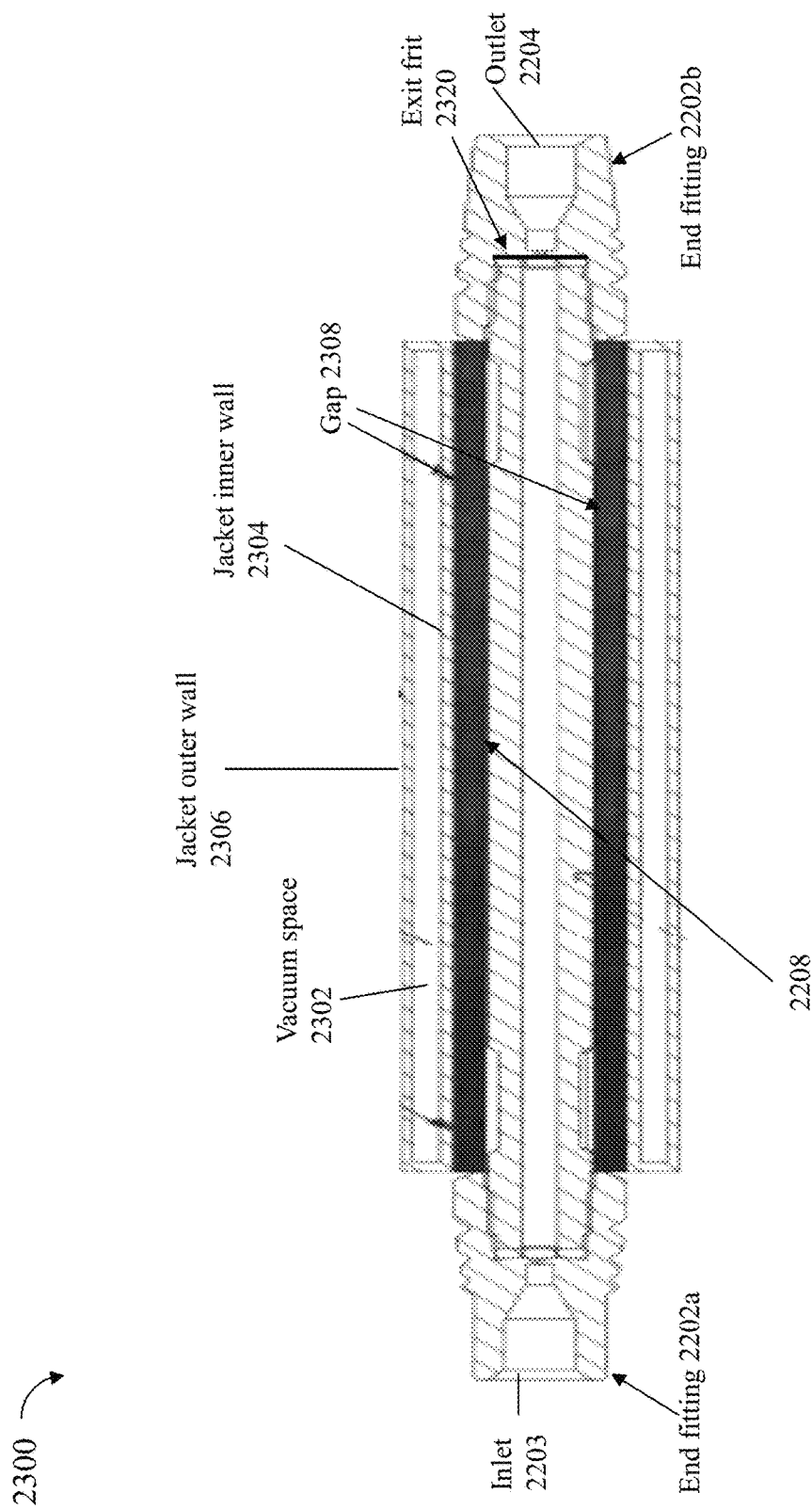

Referring to FIG. 14, shown is an example of a vacuum jacketed column in one embodiment in accordance with techniques herein. The example 2300 illustrates a cross sectional view of the column as in 2200 with the additional surrounding vacuum sleeve or jacket. The vacuum sleeve or jacket includes components denoted by elements 2302, 2304 and 2306. Element 2302 is the vacuum space or cavity surrounding the column. The jacket may surround or enclose the outer walls of column. In at least one embodiment, the jacket may be an outer cylinder or tube (having the vacuum space 2302 formed between the inner jacket wall 2304 and outer jacket wall 2306 of the outer cylinder or tube). The outer cylinder or tube forming the vacuum jacket may have an opening there through whereby the column is inserted into the opening. As described elsewhere herein, the vacuum space 2302 may include any suitable gas which is at a vacuum pressure. Examples of suitable gases as well as pressures of 2302 are described elsewhere herein. The vacuum jacket or sleeve may be slipped over a column and end fittings, such as illustrated in 2200. Because the column end fittings may be of a greater diameter than the column body, there is a gap 2308 between the inner wall 2304 of the vacuum sleeve and the outer wall 2208 of the column. Ideally, the inner wall 2304 of the vacuum jacket is in close contact with the outer wall 2208 of the column with preferably a minimum size gap 2308 between 2208 and 2304. However, gap 2308 is illustrated as enlarged in 2300 for purposes of illustration. The gap 2308 may be filled with a material, such as aerogel or other plastic foam, having insulative qualities such that a thermal barrier or insulating layer is formed in gap 2308 when filled with such material. Gap 2308 in 2500 may include a thermal wrap or radiation shield (e.g., "space blanket material" such as aluminized mylar) to prevent thermal heat loss due to radiative transfer. In at least one embodiment, the gap 2308 may include both a thermal wrap or radiation shield layer as well as an insulating foam or aerogel layer.

In at least one embodiment, the vacuum sleeve or jacket (illustrated in 2300 as including elements 2302, 2304 and 2306) may be a pre-fabricated sleeve or jacket into which a packed column with end fittings may be inserted.

Figure 15:
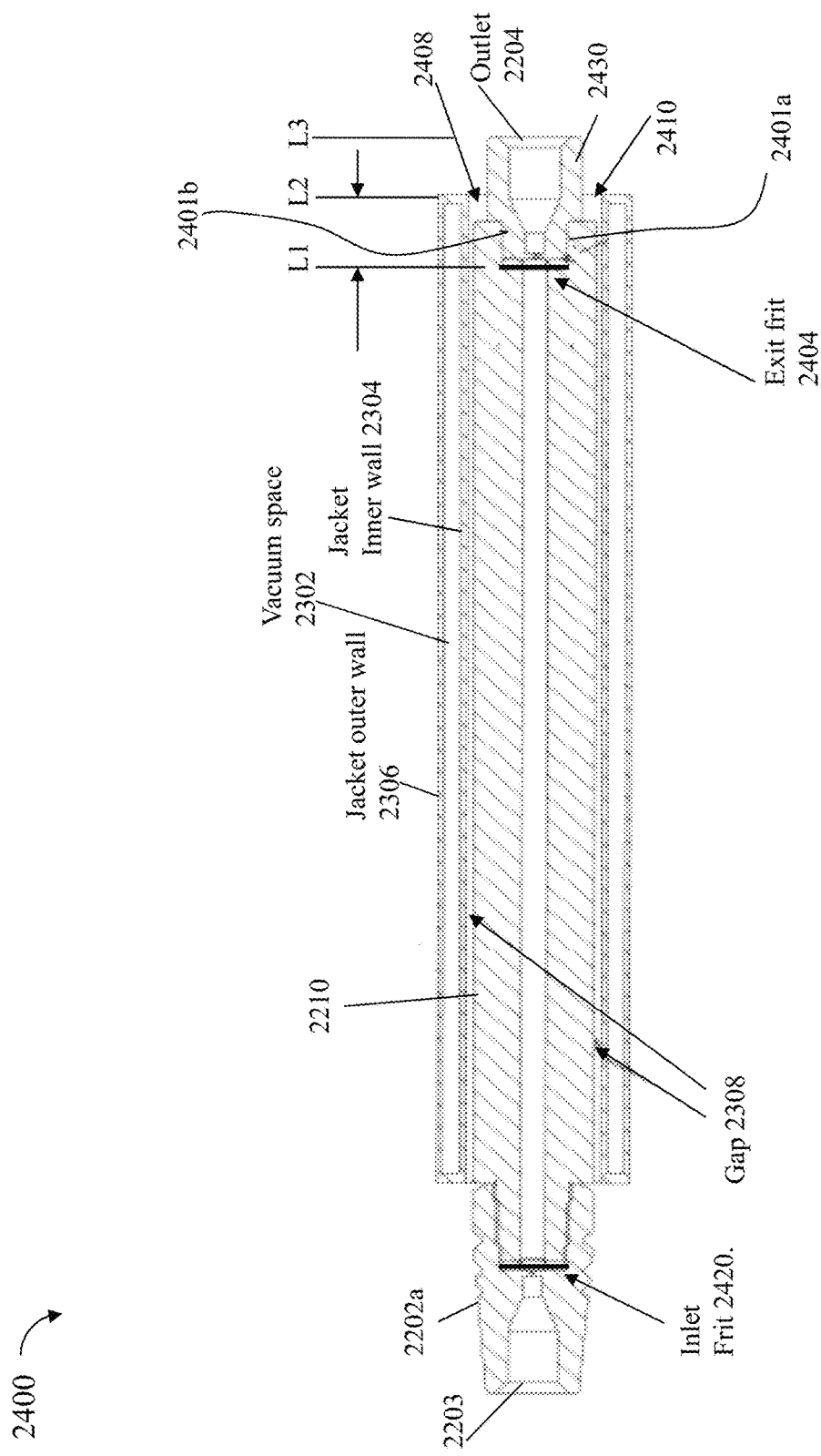
Figure 16:
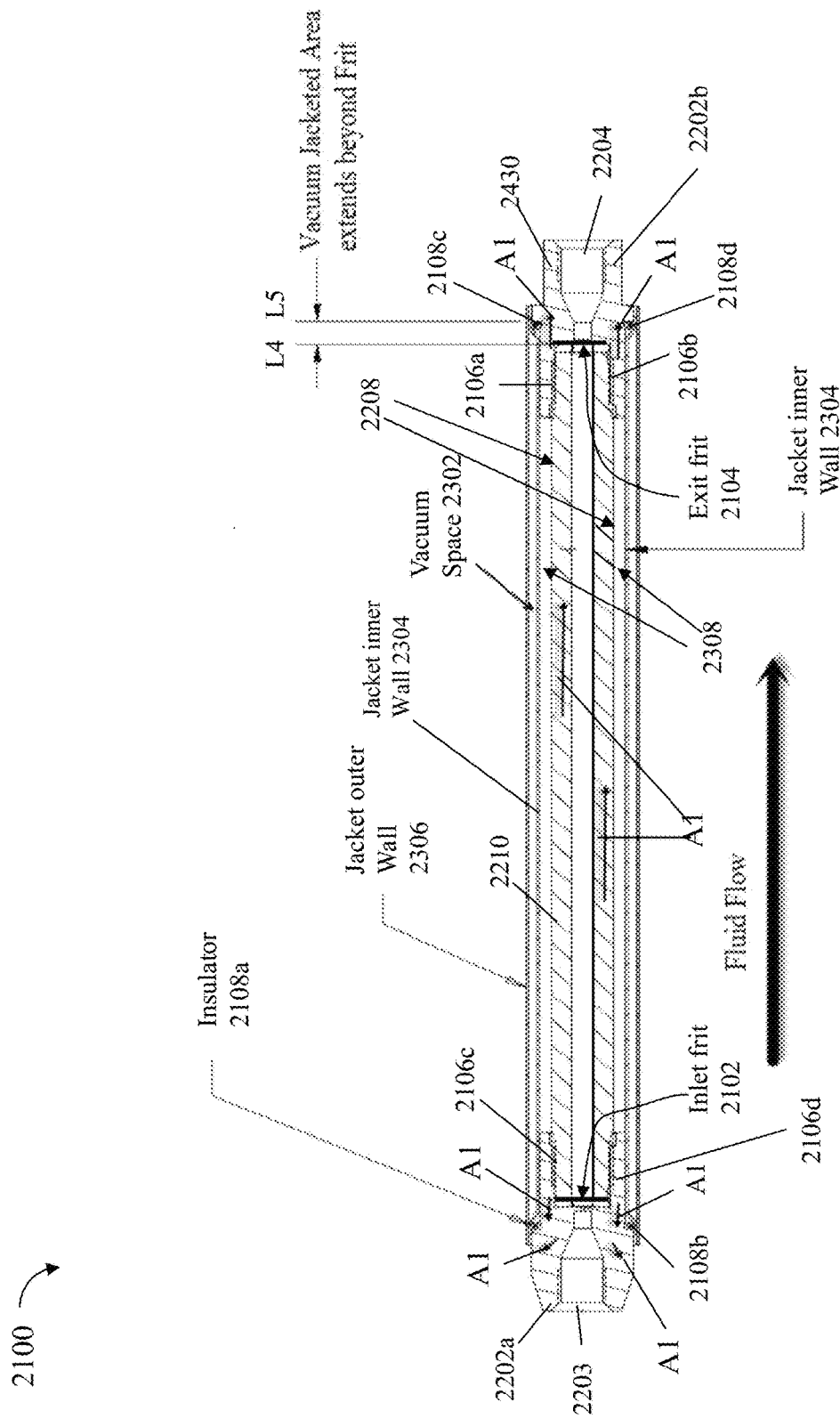
Figure 17:
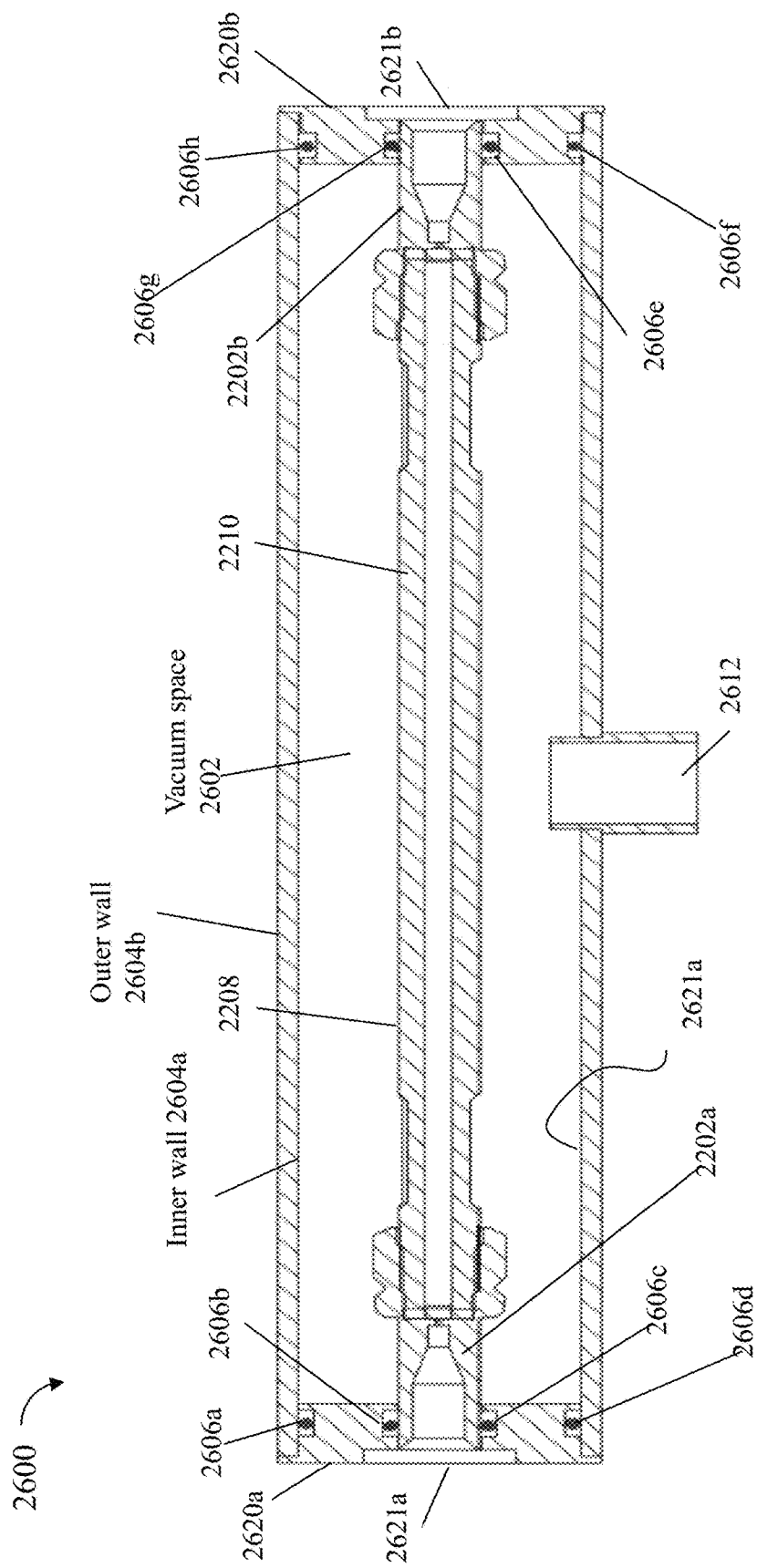
FIG. 17 is an example of a vacuum chamber with chromatographic column assembly that may be used in connection with FIG. 12.
Figure 18:
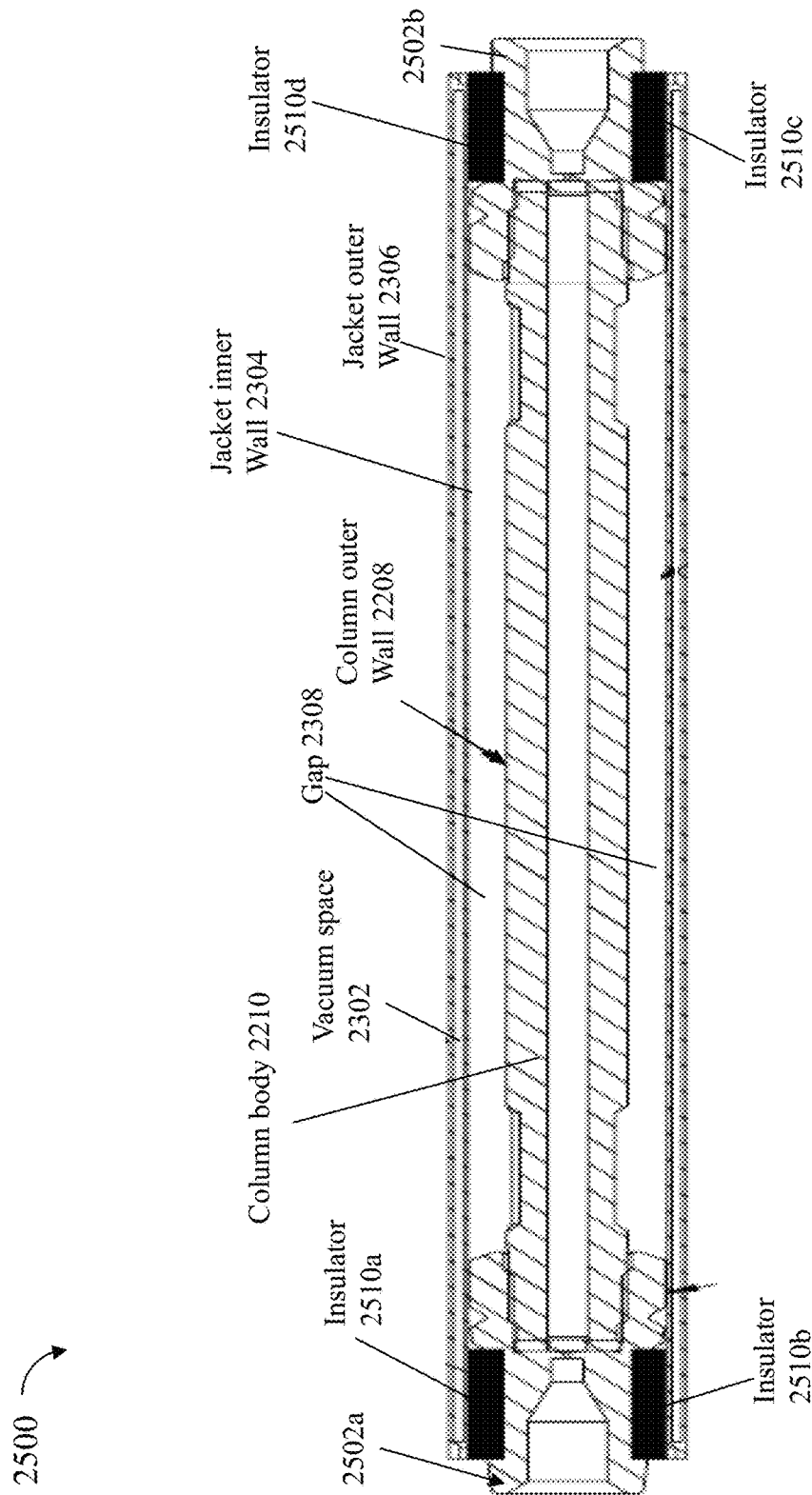

It should be generally noted that embodiments of vacuum jackets described in following paragraphs in FIGS. 15, 16, and 18 may be pre-fabricated as noted above in connection with the example 2300 of FIG. 14. Additionally, embodiments of vacuum jackets described in following paragraphs in FIGS. 15, 16, and 18 may also be an outer cylinder or tube as described above and having an opening there through whereby the column is inserted into the opening.

Referring to FIG. 15, shown is another example of a vacuum jacketed column in one embodiment in accordance with techniques herein. The example 2400 illustrates a cross sectional view of components therein and includes a vacuum jacket (including 2302, 2304 and 2306) as described in connection with the example 2300. Additionally, the gap 2308 may be filled with aerogel or other suitable material to form a thermal or insulating barrier as also described in example 2200. If the gap 2308 is sufficiently small or minimized (or otherwise completely omitted), filling the gap 2308 with such a material may be omitted. The column in example 2400 may include end fitting 2202a at the column inlet end 2203 as also described in connection with 2300.

One difference in the example 2400 in comparison to the embodiment of 2300 is that the vacuum sleeve or jacket in 2400 extends beyond the exit frit 2404 of the column. In contrast to 2400, the sleeve in 2300 does not extend beyond exit frit 2320. In 2400, L1 may denote the horizontal location of exit frit 2404, or end of the column at the outlet end; and L2 may denote the horizontal location of the end of the jacket or sleeve. Thus, the horizontal distance between L1 and L2 denotes the amount by which the vacuum sleeve extends beyond the exit frit 2404 (e.g., beyond the end of the column at the outlet end) in the example 2400. In 2400, there is a modified end fitting 2430 at the column exit or outlet 2204. The modified end fitting 2430 is described in more detail below.

As generally known in the art, frits, such as exit frit 2404 and inlet frit 2420, may be characterized as filters, such as porous metal products, that are used to retain the column packing particles inside the column, and to filter out unwanted particular matter, such as to prevent unwanted particles from entering or exiting the chromatographic system. Such particles may come from, for example, the sample, the solvent or debris generated by other components, such as a pump or injector. As illustrated in 2400 and other figures herein, frits may be placed at the ends of the column. For example, exit frit 2404 may denote the end of the chromatographic column at the outlet, and inlet frit 2420 may denote the end of the chromatographic column at the inlet.

Elements 2408 and 2410 may denote open areas from which convective heat loss may occur from column body 2210. In at least one embodiment, the areas 2408 and 2410 may be closed or sealed off, for example, such as by inserting an o-ring or plugs made of a formable, insulative material such as an insulative plastic or foam material.

It should be noted that the embodiment 2400 extends the vacuum jacket or sleeve extends only at the column exit or outlet end 2204. Although not illustrated in 2400, the vacuum jacket or sleeve may also be additionally extended beyond the column inlet frit 2420 at the column inlet (e.g., extend beyond the end of the column at the inlet end). In such an embodiment, the vacuum jacket may extend beyond both inlet frit 2420 and exit frit 2404 (e.g., jacket extends beyond both ends of the column). When extending the vacuum jacket beyond the column end (e.g., beyond 2420) at the inlet end 2203, additional open areas may be created which are similar to 2408 and 2410. In such a case, the additional open areas at the inlet end 2203 may also be plugged or sealed similar to as noted for 2408 and 2410.

It should be noted that the vacuum jacket or sleeve may be extended even further at the outlet end 2204 and/or the inlet end 2203 than as illustrated in the example 2400. For example, the vacuum jacket or sleeve may be further extended at the outlet end 2204 beyond point L2 to extend over the modified end fitting 2430. For example, the vacuum jacket or sleeve may be extended along the column to a point of at least L3, or beyond L3, wherein L3 denotes the end of modified end fitting 2430. In at least one embodiment, the vacuum jacket or sleeve may extend beyond the end of the modified end fitting 2430 so that the jacket extends beyond L3 along the column body.

An embodiment 2400 may choose to selectively only extend the vacuum jacket at the outlet 2204 but not at the inlet end 2203 since there is greater heat loss at the outlet or exit end 2204 than at the inlet end 2203. Such difference in heat loss is due to the direction of fluid flow within the column (from inlet 2203 to outlet 2204 ) causing the viscous heat generated therein whereby the temperature of the fluid tends to be greater towards the outlet or exit end 2204. As such, taking further measures to reduce heat loss at the inlet end 2203 is generally less critical than taking further measures to reduce heat loss at the outlet or exit end 2204. Thus, while preventing radial heat loss is important all along the length of the column, it is most important at the column exit or outlet 2204.

Another point of difference between 2400 and 2300 is that the embodiment of 2400 includes a modified column end fitting 2430 at outlet end 2204. Generally, the modified end fitting 2430 may differ or be modified with respect to other standard end fittings, such as end fittings 2202a-b. The modified end fitting 2430 may have a reduced mass that is generally less than the mass of one of the end fittings 2202a-b. For example, in at least one embodiment, the mass of the modified end fitting 2430 may be about 15% less than mass of a standard end fitting, such as a threaded end fitting as denoted by 2202a-b. For example, in the at least one embodiment, the weight of a standard end fitting, such as end fitting 2202a at the column inlet 2203, may be about 0.282 ounces and the reduced weight of the modified end fitting 2430 may be about 0.24 ounces. Generally, in at least one embodiment, the mass of the modified end fitting 2430 may be equal to or less than about 50% of the mass of a standard end fitting, such as an end fitting used at the column inlet end 2203. In at least one embodiment, the mass of the modified end fitting 2430 may be at least about 15% less than the mass of a standard end fitting, such as an end fitting used at the column inlet end 2203. Generally, the smaller the mass of the modified end fitting 2430 at the outlet end 2204, the better. Such efforts to reduce the mass of modified end fitting 2430 at the outlet column end 2204 contribute to reduced heat loss through the column outlet end 2204.

In at least one embodiment, the modified end fitting 2430 may be threaded to mate with other threaded contact surfaces of the column body 2210. For example, 2401a-b may denote the surfaces of the end fitting 2430 in contact with mated thread surfaces of the column body 2210.

In at least one embodiment, the end fitting 2430 may alternatively be a non-threaded end fitting. For example, the end fitting 2430 may be plug-style end fitting that is fitted to mate with a connector (e.g., the end fitting 2430 may be inserted or plugged into the other fitted connector, or the fitted connector may otherwise be inserted or plugged into the end fitting 2430). With such plug style end fittings, a first component may be inserted into a second component to form a seal at contacting surfaces. One or more of the contacting surfaces may be formed from any suitable material such as made of a formable or flexible material such as PEEK (Polyether ether ketone) or other polymer. As known in the art, PEEK is a colorless organic thermoplastic polymer. Non-threaded end fittings, as may be more generally used in connection with end fittings of any embodiment herein, are also discussed elsewhere herein.

In the embodiment 2400, the column with end fittings may be inserted into a prefabricated vacuum jacket or sleeve comprising elements 2302, 2304 and 2306 in a manner similar to that as noted above in connection with 2300. Prefabricated vacuum sleeves, such as depicted in 2300 and 2400, may be produced by well-known techniques that are in use today for the production of stainless steel vacuum flasks. Specifically, this involves reducing the amount of dissolved gas in the stainless steel by baking the stainless steel at a high temperature, typically 350 degrees C. to 1000 degrees C. in a vacuum environment. Additionally, getter materials, to react with and trap residual gas that may emerge with time, may be introduced into the vacuum region of the sleeve during manufacture. This technique is also well-known. Various techniques for sealing off vacuum flasks during production exist and can be applied to the manufacture of prefabricated vacuum sleeves. The use of low emissivity foils internal to the vacuum region is also a known technique to reduce radiative transfer in vacuum flasks.

Referring to FIG. 16, shown is an example 2100 of another embodiment of a vacuum jacketed column in accordance with techniques herein. As described below in more detail, 2100 is an example of a vacuum jacketed column where the jacket extends beyond the frits 2104, 2102 at the outlet 2204 and inlet 2203 ends of the column.

The example 2100 illustrates a cross sectional view of components therein. The example 2100 includes elements similarly numbered to corresponding elements as described elsewhere herein in connection with other embodiments. For example, the vacuum jacketed column 2100 may include the vacuum jacket or sleeve comprising the jacket outer wall 2306, jacket inner wall 2304 and vacuum space 2302. The vacuum jacket or sleeve may be a prefabricated sleeve. The example 2100 includes a column having a column body 2210 with end fitting 2202a and modified end fitting 2430. The example 2100 also includes gap 2308 between the column outer diameter or wall 2208 and jacket inner wall 2304. As described in connection with other embodiments, the gap 2308 may be optionally filled with one or more materials to form an insulative or thermal barrier.

In a manner similar to that as described elsewhere herein in connection with lines L1 and L2 in the example 24, L4 may denote the horizontal location of exit frit 2104 (e.g., end of column at the exit or outlet end) and L5 may denote the horizontal location of the end of the vacuum jacket or sleeve. Thus, the horizontal distance between L4 and L5 denotes the amount by which the vacuum sleeve extends beyond the exit frit 2104 in the example 2100. As can be seen in 2100, the vacuum jacket or sleeve also extends beyond the inlet frit 2102 (e.g., end of column) at the column inlet 2203.

The example 2100 also includes insulators 2108a-d that prevent conduction between the end nut/end fittings and the jacket outer wall, and also prevent internal convection. Insulators 2108a-d may be generally made of any suitable insulating material such as an insulating foam or plastic or rubber. Insulators 2108a-d may be, for example, insertable plugs, orings, and the like, made of a flexible or formable insulating material. Thus insulators 2108a-d may be used to minimize conductive heat loss through end fitting surfaces at the column inlet 2203 and outlet or exit 2204. In an embodiment such as described in connection with FIG. 16 (and others herein) where the vacuum space is a cylinder or tube-like in shape such, the insulators 2108a-d may be formed from 2 o-rings (e.g., insulators 2108a-b correspond to one o-ring; insulators 2108c-d correspond to a second o-ring).

In the example 2100, arrows A1 within the components indicate the heat flow path such as along the fluid flow path and illustrating heat flow out of the column body towards the column inlet 2203 and column outlet or exit 2204. The prefabricated vacuum jacket or sleeve used in the example 2100, as well as in other embodiments herein (e.g., in 2300, 2400, 2500), may be, for example, an Insulon® thermal barrier or jacket from Concept Group, Inc. of Jupiter Fla.

The inventors have obtained IR (infrared) camera images of the vacuum jacketed column embodiments described herein at steady state whereby such images illustrate that there is minimal heat loss and primarily at the column ends. For example, such IR camera images were obtained by the inventors, using the embodiment of the vacuum jacketed column 2100. To compare and contrast, the vacuum jacketed column had holes drilled therein to thereby allow for heat loss throughout the length of the jacketed column where such heat loss was clearly illustrated by additional IR camera images obtained for the holed vacuum jacketed column at steady state.

IR camera images were also obtained by the inventors for the vacuum jacketed column embodiment 2100 described herein during a cooling phase where there was no flow. Such IR images illustrated that there was generally heat loss primarily from the open ends of the jacketed column with minimal or no heat loss elsewhere.

Referring to FIG. 17, shown is an example of a vacuum chamber that may be used in an embodiment in accordance with techniques herein. The example 2600 generally illustrates a cross sectional view of a vacuum chamber, module or enclosure into which a packed column assembly and column end fittings may be inserted. For example, the chamber 2600 may be any suitable shape having sufficient size and dimensions to accommodate placement of the column assembly (column and end fittings). For example, the chamber 2600 may have a rectangular shape, a tube or cylinder, and the like, where 2600 shows a cross sectional view thereof. The chamber, for example, may open from one or more of its sides or walls to allow for column placement. For example, one or both of the end walls 2620a-b of the chamber may be removable to allow for column placement.

In operation, the chamber is not initially evacuated. When not evacuated (e.g., there is no vacuum in area 2602), the packed column with end fittings may be inserted into the chamber which may then be closed or sealed. Subsequently, air or other gas within the chamber (in area 2602) may be evacuated through port 2612 to create vacuum space 2602 surrounding the column 2210. The vacuum space 2602 is between the inner walls of the chamber and the outer wall 2208 of the column body 2210. In this manner, the vacuum space 2602 may provide an insulation layer, in a manner as described elsewhere herein, surrounding the column to minimize heat loss in the column.

The end walls or end caps 2620a and 2620b of the chamber may be made of any suitable material, such as PEEK or other polymer. The end walls 2620a-b may be made, for example, from an insulating material to minimize heat loss through column end fittings 2202a-b. Elements 2606a-h denote seals or insulators that may be made of an insulating material to reduce conductive heat loss through contacting surfaces. In particular, 2606a may be an insulator placed between contacting surfaces of the inner wall 2604a of the chamber and the surface of end cap 2620a. Insulators 2606b and 2606c may be placed between contacting surfaces of the end fitting 2202a and end cap 2620a. Insulator 2606d may be placed between contacting surfaces of the end cap 2620a and inner wall surface 2621a of the chamber. Insulator 2606h may be placed between contacting surfaces of the inner wall 2604a of the chamber and the surface of end cap 2620b. Insulators 2606g and 2606e may be placed between contacting surfaces of the end fitting 2202b and end cap 2620b. Insulator 2606f may be placed between contacting surfaces of the end cap 2620b and inner wall surface 2621a of the chamber. In an embodiment where the chamber is a tube-like shape, insulators such as in the form of o-rings of suitable material may be used (e.g., such as described in connection with 2108a-d of the example 2100). In such an embodiment where the chamber is a cylinder or tube-like in shape, the insulators 2602a-h may be formed from 4 o-rings (e.g., insulators 2606a and 2606d correspond to one o-ring; insulators 2606b and 2606c correspond to a second o-ring; insulators 2606e and 2606g correspond to a third o-ring; and insulators 2606f and 2606h correspond to a fourth o-ring).

In the example 2600, it should be noted that fluid connections to the column are made outside the vacuum chamber end walls 2620a-b (in contrast to FIG. 2 where portion of connecting tubing external to column is also in vacuum region or chamber). For example, with reference back to FIG. 2, elements 11a-b denote portions of the connecting tubing which are external to the column and its end fittings wherein portions 11a-b are also within the vacuum chamber or jacket 120. In contrast, reference is made to 2600 where the end faces 2621a-b of the column end fittings are at the end walls 2620a-b of the chamber. Thus, in 2600, the vacuum chamber may not contain any connecting tubing of the liquid flow path extending beyond the column. In this manner, external fluid connections to the column in the embodiment 2600 are made outside the vacuum chamber (in contrast to FIG. 2 where portion of connecting tubing external to column is also in vacuum region or chamber). Put another way, connecting tubing may connect the column within the chamber to another component where no portion of the connecting tubing is located in the chamber or vacuum space 2602. Such connecting tubing connects to the column through end faces 2621a-b of the column end fittings located at the end walls 2620a-b of the chamber.

One advantage of the arrangement of 2600, for example, is obtained when an external tubing or connector (external to the column) needs to be replaced. In the embodiment 2600, such tubing may be replaced without internally accessing and modifying components in the chamber. Such an advantage may not be obtained, for example, using the arrangement of FIG. 2.

In at least one embodiment, the chamber 2600 including the column assembly as illustrated may be prefabricated as a complete unit such as a welded assembly. In such a case, the prefabricated chamber may be connected to a pump through 2612 to create the vacuum in 2602 on site. As a variation, the complete prefabricated chamber may be evacuated and sealed whereby port 2612 may be omitted. In this manner, the chamber 2600 including the column assembly illustrated may be prefabricated to include the evacuated vacuum space 2602.

Referring to FIG. 18, shown is another example of an embodiment of a vacuum jacketed column in accordance with techniques herein. The example 2500 includes components similar to components of other vacuum jacketed column embodiments described herein. The example 2500 illustrates a cross sectional view of another embodiment of a vacuum jacketed column in accordance with techniques herein. For example, 2500 includes a vacuum jacket (comprising vacuum space 2302, outer wall 2306 and inner wall 2304), a column body 2210 with end fittings 2502a-b, and gap 2308 between the column outer wall 2208 and jacket inner wall 2304. The jacket in 2500 extends beyond the end frits at both ends of the column similar to as described in 2100. As described in connection with other embodiments herein, the gap 2308 in 2500 may be a spacing or area including one or more additional layers of materials forming an additional thermal or insulative barrier. For example, gap 2308 in 2500 may be filled with an insulating material, such as an insulating foam, aerogel, and the like. Gap 2308 in 2500 may include a thermal wrap or radiation shield (e.g., "space blanket material" such as aluminized mylar) to prevent thermal heat loss due to radiative transfer. In at least one embodiment, the gap 2308 in 2500 may include both a thermal wrap or radiation shield layer as well as an insulating foam or aerogel layer. Additionally, insulators 2510a-d may be included to reduce conductive heat transfer between surfaces of the jacket, column and end fittings. Insulators 2510a-d may be made from a suitable material and form as described elsewhere herein (e.g., as in connection with 2108a-d of the example 2100).

End fittings (e.g., 2502a-b) or caps described herein may be threaded end fittings that attach to corresponding mated threaded surfaces of the ends column body. More generally, any end fittings used in any embodiment described herein may alternatively be non-threaded end fittings. For example, an embodiment may alternatively use non-threaded end fittings such as a face seal (e.g., O-ring) at the ends of the column. A face seal is a seal in which the sealing surfaces are normal to the axis of the seal. Face seals may be used, for example, to prevent leakage in the radial direction with respect to the axis of the seal. In this manner, the sealing surfaces may include an o-ring (e.g. may be substantially ring-shaped or disc-shaped) and may be placed at one or more ends of the column (e.g., inside the column tubing forming the flow path). Another connector may be snuggly inserted into the tubing at the end of the column including the face seal whereby outer surfaces of the inserted other connector form a radial seal with contact surfaces of the face seal, such as the o-ring.

Such non-threaded end fittings, such as the face seal (e.g., o-ring), may be made of any suitable material such as metal, Vespel, PEEK, or any other polymeric or elastomeric material. Generally, face seals may be used to facilitate easy connection of ends of the chromatographic column with other tubing, connection to other components, and the like. For example, with face seals, another connection or tube may be inserted (e.g., plugged) into the exit end and/or inlet end of the vacuum jacketed chromatographic column to thereby provide connection of the jacketed column to another component (e.g., injector, detector, preheater).

Consistent with discussion elsewhere herein, in some embodiments, the vacuum sleeves or jackets, such as described in 2100, 2300, 2400, and 2500, may be prefabricated whereby a column assembly with end fittings may be inserted into such jacket or sleeve at a customer site. In at least some embodiments, the vacuum sleeves or jackets, such as described in 2100, 2300, 2400, and 2500, may be tubes or approximate a tube-like shape into which the column is placed. The vacuum sleeve or jacket may be generally have walls thereof made of any suitable material such as a stainless steel, or more generally steel, with sufficient dimensions to accommodate insertion of components such as the chromatographic column and end fittings, therein. For example, in at least one embodiment, the vacuum jacket or sleeve may be a tube or cylinder with an opening there through and where the column assembly is inserted into the opening extending through the tube. The tube or cylinder forming the vacuum jacket may be a prefabricated, sealed, pressurized vacuum chamber at a suitable vacuum pressure as described elsewhere herein.

Alternatively, the vacuum jacket column assembly—including both the vacuum jacket or sleeve in combination of the column assembly—may be sold with the column assembly fixed inside the jacket using any suitable means such as an adhesive. In such a column assembly, the end fittings may be non-threaded such as using face seals at the column ends. As yet a further variation, the vacuum jacket may be integrated with or coupled to another components, such as a detector or injector, without a column. Subsequently, the column may be inserted or placed in the vacuum jacket, such as at a customer site. In this latter instance, the jacket may be configured so that the column may be removable from the vacuum jacket.

In connection with embodiments described herein using the vacuum jacket, vacuum chamber or enclosure, and the like, examples of suitable vacuum pressures are described herein. For example, in at least one embodiment, the vacuum pressure may be less than approximately $10^{-3}$ atm. Generally, the lower the vacuum pressure used such as in various embodiments of the vacuum jacketed column described herein, the better the chromatographic performance due to the better adiabatic conditions achieved.

Described elsewhere herein are further examples of pressures and pressure ranges that may be used in connection with any of the various embodiments described herein.

Referring back to FIG. 12, it should be noted that any embodiment of the vacuum jacketed chromatography columns, such as described in connection with 2300, 2400, 2100, 2500, as well as the vacuum chamber arrangement of 2600, (and variations described herein), may be used as element 2002 in a system in accordance with techniques herein.

Consistent with discussion elsewhere herein, viscous heat is produced due to the friction of the eluent or mobile phase against the column particles. This heat dissipates along and across the column and axial and radial temperature gradients occur. The radial temperature gradient adversely affects the performance of chromatography experiments. The inventors conducted experiments and modeling in accordance with conditions where the chromatography column was placed inside a vacuum housing surrounding the chromatography column. Such conditions used in connection with modeling and experiments conducted by the inventors included a chromatography column with about a 6 mm. outer diameter. The vacuum housing used is a cylindrical stainless steel housing tube (6.0 cm inner diameter) surrounding the chromatography column (e.g., stainless steel column), where air is confined in the space between the outer chromatography column wall and the inner wall of the cylindrical housing tube in which the air pressure is progressively reduced over a range of vacuum pressures, from approximately $1.4 \times 10^{-5}$ Torr to approximately 750 Torr. Room temperature and the temperature of the air initially in the housing is approximately 297.0 Kelvin. In such experiments and models, heat transfer at the chromatography column wall may occur by natural air convection, air conduction and thermal radiation (e.g., through air between 1) the outer chromatography column wall and inner wall surface area of surrounding vacuum housing tube, and 2) external surface area of vacuum housing tube and the lab).

The following paragraphs summarize some of the result obtained by the inventors based on such modeling and experiments. As further detailed below, such results may be used in determining pressures and pressure ranges of the vacuum that may be used in connection with embodiments of techniques herein. In particular, as described in more detail below, discussion of results in connection with FIGS. 19, 20, 21, and 22 may be used in determining pressures and pressure ranges of the vacuum air pressure such as may be used in connection with embodiments described in connection with FIGS. 12, 13, 14, 15, 16, 17 and 18. It should be noted that other suitable pressures described herein may also be used in connection with embodiments described in connection with FIGS. 12, 13, 14, 15, 16, 17 and 18.

Four different pressure domains may be identified in connection with the above-noted range of vacuum pressures, from approximately $1.4 \times 10^{-5}$ Torr to approximately 750 Torr. Generally, the four domains are based on identified pressure boundaries determined in accordance with changes that occurred in connection with various physio-chemical properties during modeling and experimentation as the vacuum air pressure varies through the foregoing range.

Figure 19:
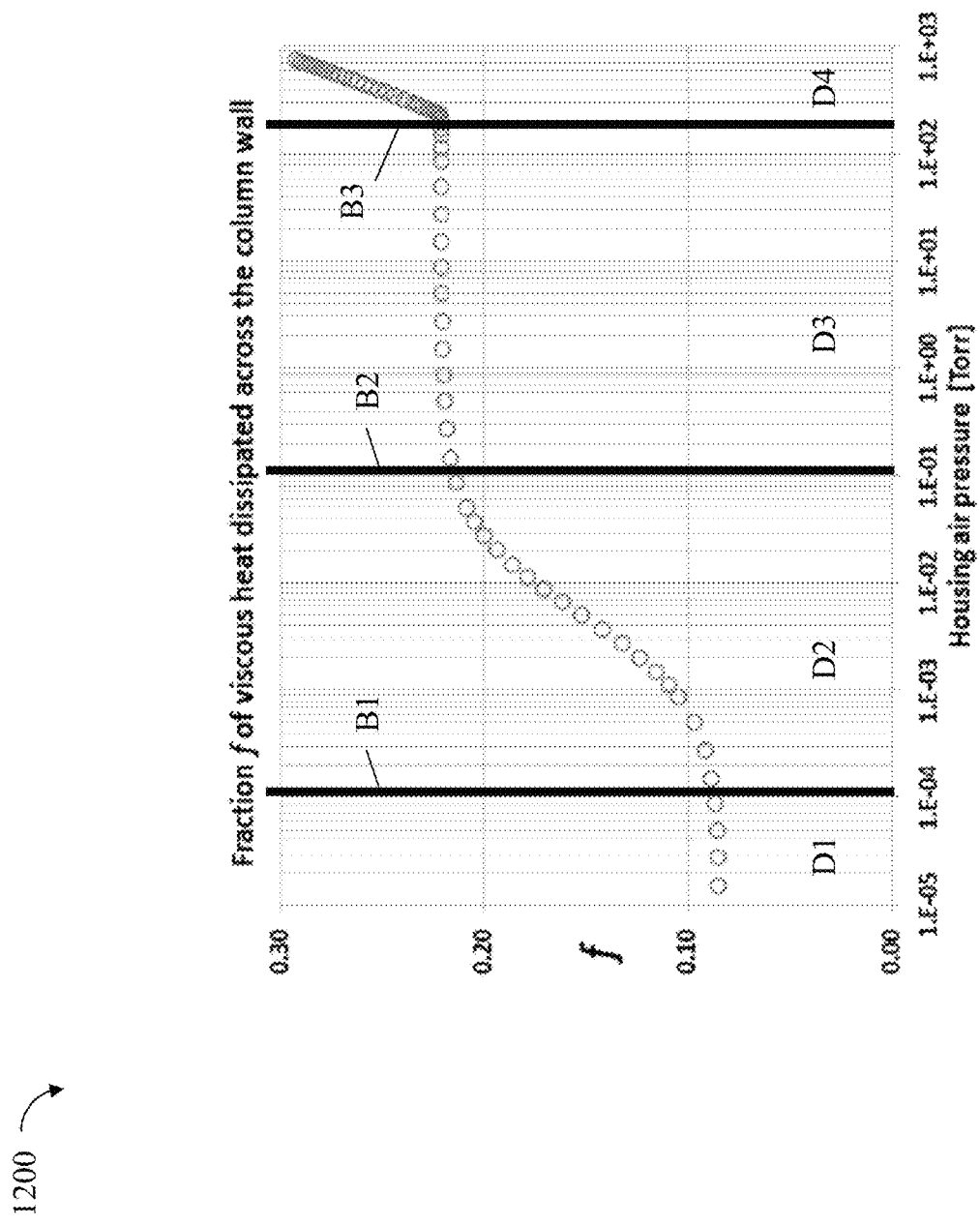
FIGS. 19, 20, 21 and 22 are plots or graphical illustrations of results obtained from experiments and modeling performed by the inventors using a vacuum jacketed column in accordance with techniques herein.

For example, reference is made to the example 1200 of FIG. 19. The example 1200 includes a plot of calculated viscous heat fraction, $f$, (e.g., on the Y axis) as a function of the vacuum housing air pressure (e.g., on the X axis). The viscous heat fraction $f$ denotes the fraction of the viscous heat dissipated in the perpendicular direction with respect to the chromatography column axis under a steady state regime (e.g., a stationary radial temperature profile is established from the chromatography column axis/center of the packed bed ($T_{bed}$) to the stainless steel chromatography column tube ($T_{SS}$ column), the confined air ($T_{air}$) in the space between the outer chromatography column wall and the inner wall of the cylindrical housing tub, the stainless steel housing tube ($T_{SS}$ tube) forming the wall of the vacuum tube or housing, and to the surrounding lab air ($T_{\infty}$ approximately 297.0 Kelvin)). The plot of 1200 denotes the calculated viscous heat fraction f based on heat and mass transfer models used by the inventors. The plot 1200 illustrates three pressure boundaries denoted by vertical lines B1, B2 and B3, where B1 is approximately $10^{-4}$ Torr, B2 is approximately $10^{-1}$ Torr, and B3 is approximately 200 Torr. As discussed below in more detail, B3 may denote the boundary where heat transfer by natural convection is eliminated at pressures below B3; and B1 may denote the boundary where heat transfer by air conduction is eliminated at pressures below B1.

Based on the foregoing pressure boundaries, the vacuum housing pressure range of the X axis may be partitioned into four pressure domains denoted by D1, D2, D3 and D4, as also further described below.

Domain D1 may denote vacuum housing pressures approximately less than $10^{-4}$ Torr. At pressures in D1, heat loss through the chromatography column wall may be largely or substantially based on radiation between the chromatography column and vacuum housing (both of which are made of stainless steel in modeling and experimental testing conditions used by the inventors). In Domain D1, air density may be characterized as too small to transfer heat by natural convection, and thermal conductivity of air may be considered negligible (e.g., two orders of magnitude or more smaller than that of air at atmospheric pressure). Thus, D1, where vacuum housing pressures are less than $10^{-4}$ Torr, may be characterized as having viscous heat transfer based on radiation at the external surface of the stainless steel column tube (e.g., no heat transfer due to convection or conduction).

Domain D2 may denote vacuum housing pressures from approximately $10^{-4}$ Torr to approximately $10^{-1}$ Torr. Domain D2 may be further defined as a range of pressures having a lower bound of approximately equal to, or greater, than $10^{-4}$ Torr, and an upper bound also less than approximately $10^{-1}$ Torr (e.g., $10^{-4}$ Torr≤P<$10^{-1}$ Torr, where P is vacuum housing air pressure in D2). At pressures in D2, heat transfer through the chromatography column wall may be based on radiation between the chromatography column and vacuum housing, and air conduction through the vacuum housing. However, heat transfer in D2 is not due to convection. Additionally in D2, conduction contributes more to heat transfer as housing air pressure increases. In one aspect, Domain D2 may be characterized as a transition zone over which the heat transfer via conduction is progressively reduced as vacuum pressure decreases.

Domain D3 may denote vacuum housing pressures from approximately $10^{-1}$ Torr to approximately 200 Torr. Domain D3 may be further defined as a range of pressures having a lower bound of approximately equal to, or greater, than $10^{-1}$ Torr, and an upper bound also less than approximately 200 Torr (e.g., $10^{-1}$ Torr≤P<200 Torr, where P is vacuum housing air pressure in D3). At pressures in D3, $f$ remains generally constant independent of vacuum housing air pressure. In D3, heat transfer due to convection may still be negligible whereby heat transfer through the chromatography column wall may be generally considered due to radiation between the chromatography column and vacuum housing, and air conduction through the vacuum housing.

Domain D4 may denote vacuum housing pressures from approximately 200 Torr to approximately 750 Torr. Domain D4 may be further defined as a range of pressures having a lower bound of approximately equal to, or greater, than 200, and an upper bound also less than approximately 750 (e.g., 200 Torr≤P<750 Torr, where P is vacuum housing air pressure in D4). At pressures in D4, heat transfer through the column wall are based on radiation between the chromatography column and vacuum housing, air conduction through the vacuum housing, and also due to convection (e.g., heat transfer via convection from heated column wall to housing vacuum tube). Thus, B3 may denote the boundary where pressures greater than about B3 (e.g., pressures in D4) experience heat transfer additionally due to convection, and for pressures less than about B3 (e.g., pressures in D3, D2 and D1), heat transfer by convection may be negligible or non-existent. In one aspect, Domain D4 may be characterized as a transition zone over which the heat transfer via natural convection is progressively reduced as vacuum pressure decreases from approximately 750 Torr to approximately 100 Torr. Pressures in D4 result in heat loss via conduction, convection and radiation.

Additional modeling and experiments conducted by the inventors produced results that generally confirm the foregoing with respect to boundaries B1, B2, B3 and B4 as well as Domains D1, D2, D3 and D4 as in 1200.

Figure 20:
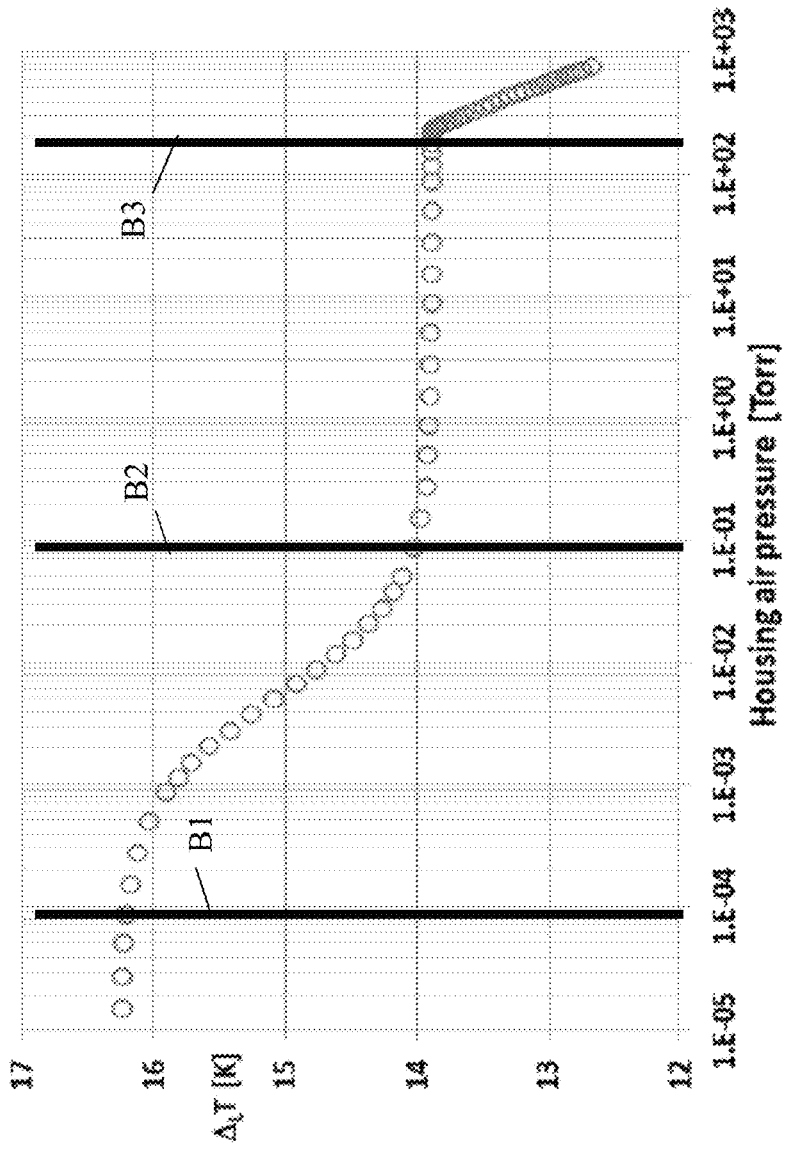

For example, with reference now to FIG. 20, using models, the inventors determined calculated values for the amplitude, $\Delta_L T$, of the axial temperature rise, change, or gradient as a function of the housing air pressure, where the inlet column temperature, $T_{inlet}$, is approximately 297.0 K. Thus, $\Delta_L T$ denotes the temperature difference along the column length (e.g., temperature difference between the chromatography column outlet and chromatography column inlet). As denoted in the example 1300, changes in $\Delta L_T$ (Y axis) occurred at approximately the same boundary pressures B1-B3 (X axis) as described in connection with 1200. Variations of the generated curve of 1300 are directly related to those of $f$ (e.g., as illustrated in 1200) with increasing vacuum housing air pressure. Generally, the smaller the amount of viscous heat loss through the column wall, the larger the amplitude of the axial temperature gradient, $\Delta_L T$. (e.g., values for $\Delta_L T$ in 1300 are about 16.2 K for pressures below B1 of approximately 10-4 Torr, (where there is radiation-controlled heat transfer as in D1); 13.9 K for pressures between B2 (approximately $10^{-1}$ Torr) and B3 (approximately 100 Torr) where there is heat transfer via radiation and also conduction); and 12.7 K for pressures above B3 where heat transfer occurs through radiation, conduction, and convection.)

Figure 21:
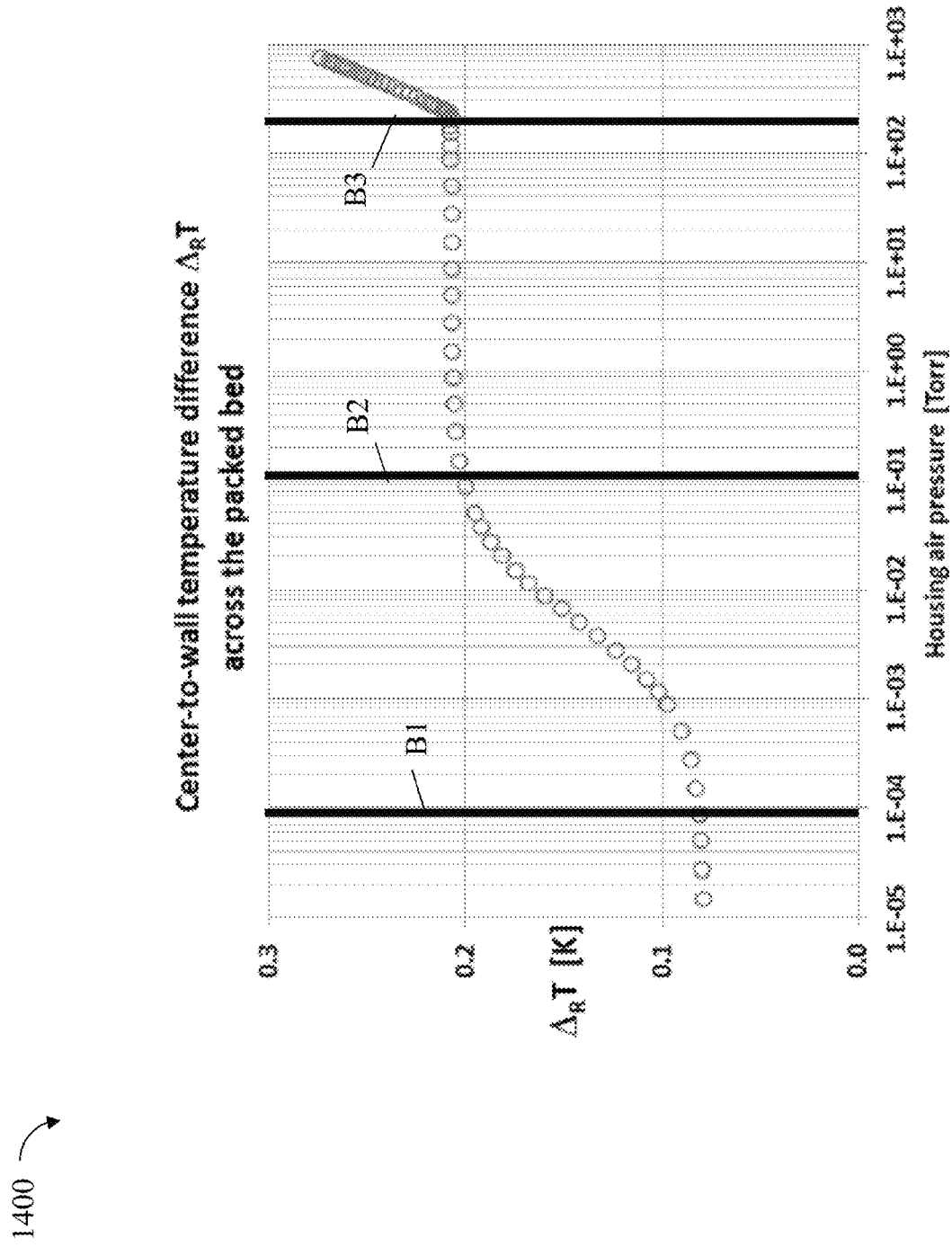

Additionally, with reference now to FIG. 21, using models, the inventors determined calculated values for the amplitude, $\Delta_R T$, of the radial temperature change or gradient as a function of the housing air pressure, where the inlet column temperature, $T_{inlet}$, is approximately 297.0 K. Thus, $\Delta_R T$ denotes the temperature difference from the chromatography column center to chromatography column wall. As denoted in the example 1400, changes in $\Delta_R T$ (Y axis) occurred at approximately the same boundary pressures B1-B3 (X axis) as described in connection with 1200 and 1300. Variations of the generated curve of 1400 are directly related to those off (e.g., as illustrated in 1200 ) with increasing vacuum housing air pressure. Generally, the larger the amount of viscous heat loss through the column wall, the larger the amplitude of the radial temperature change or gradient, $\Delta_R T$.

Figure 22:
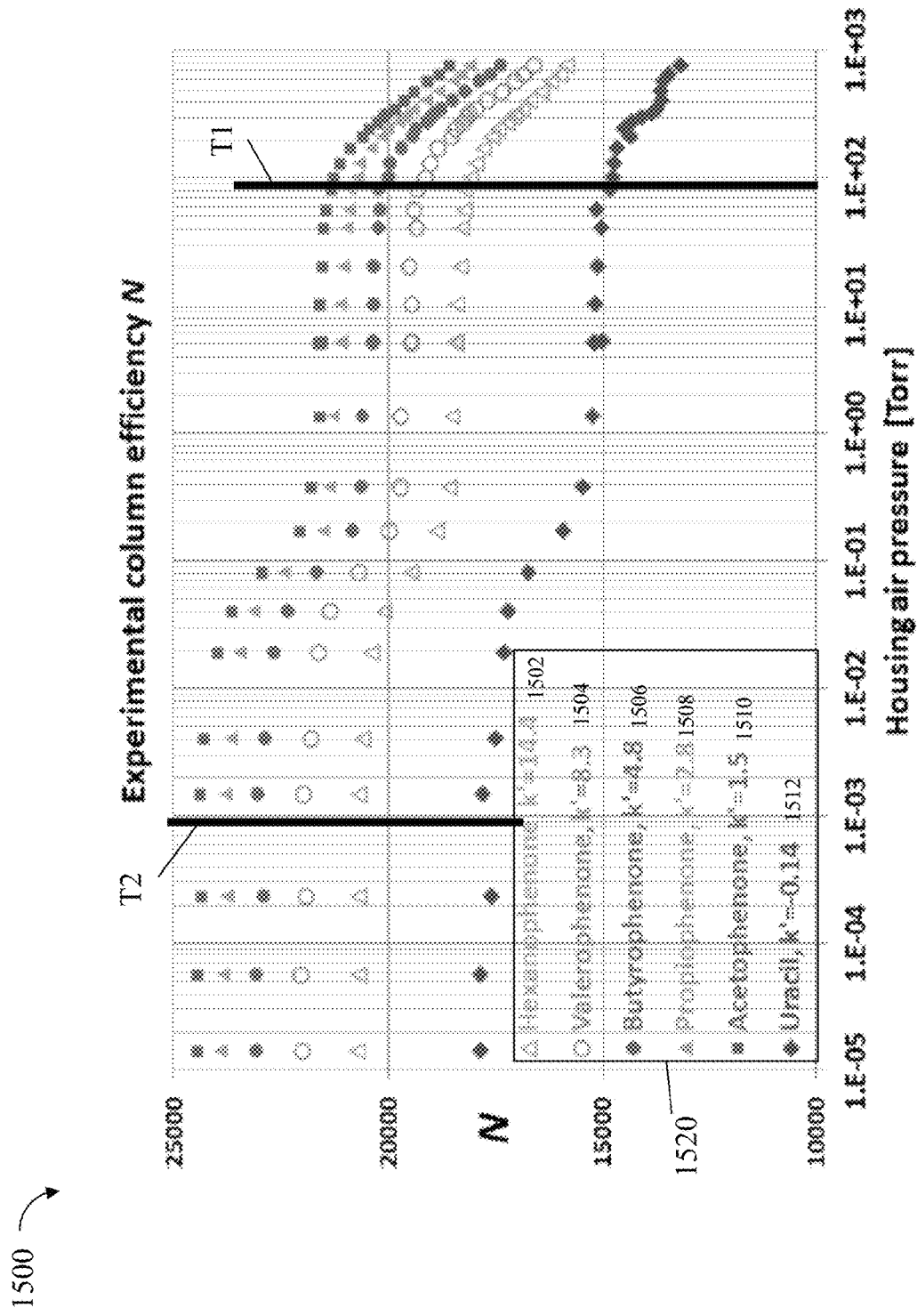

Further, with reference now to FIG. 22, based on experiments performed by the inventors, shown is a plot 1500 of corrected experimental column efficiencies (N on Y axis) for each of 6 injected compounds 1520, as a function of vacuum housing air pressure (X axis). As illustrated in 1500, values of N for each compound have a particular shape as identified in legend 1520 (e.g., 1502 unfilled triangle denotes N values for hexanophenone; 1504 unfilled circle for valerophenone; 1506 filled circle for butyrophenone; 1508 filled triangle for propiophenone, 1510 filled square for acetophenone, and 1512 filled diamond for uracil). As illustrated in 1500, two pressure transitions may be observed whereby a first pressure transition (from about 750 Torr to about 100 Torr) corresponds to the progressive elimination of heat transfer by natural convection, and where a second pressure transition (from about 1 Torr to about $10^{-3}$ Torr) corresponds to the progressive elimination of heat transfer by air conduction (from 1 to 10-3 Torr). Generally, the foregoing first pressure transition corresponds approximately to the pressure domain D4; and the foregoing second pressure transition corresponds approximately to the pressure domain D2.

The foregoing first pressure transition completed at about or below 100 Torr as denoted by T1, in general agreement with the modeled results, transitions and behaviors (e.g., within acceptable tolerances and amounts and expected variations determined by the inventors), such as described elsewhere herein and illustrated in connection with 1200, 1300 and 1400.

The foregoing second pressure transition completed at about $10^{-3}$ Torr as denoted by T2, in general agreement with the modeled results, transitions and behaviors (e.g., within acceptable tolerances and amounts and expected variations determined by the inventors), such as described elsewhere herein and illustrated in connection with 1200, 1300 and 1400. It should be noted that despite the foregoing second pressure transition being from about 1 Torr to about $10^{-3}$ Torr, the inventors have determined that the actual transition is likely to correspond to the pressure range from about $10^{-1}$ Torr to about $10^{-4}$ Torr, (thereby having an even greater correlation and agreement with the modeled results of heat transfer as in 1200, 1300, and 1400).

Additionally, based on 1500, it may be observed that relative increases in chromatography column efficiency are about 15% after elimination of heat loss by natural air convection, such as illustrated by values N=15876 at about 750 Torr to N=18478 at about 100 Torr for hexanophenone; and an increase in chromatography column efficiency about 30% after elimination of heat loss by both natural air convection and conduction, such as illustrated by values of N=15876 at about 750 Torr to N=20751 at about $10^{-3}$ Torr for hexanophenone.

Thus, an embodiment in accordance with techniques herein may specify particular pressure ranges based on the foregoing results, whereby a selected pressure for the vacuum housing may be subject to any such specified pressure range boundaries or limits. Generally, lower pressures (e.g., deeper/stronger vacuums) may be desirable in order to maximize chromatography column efficiency. The vacuum housing pressure may be less than about 760 Torr or 1 atm. The vacuum housing pressure may be less than about 750 Torr. More preferably, vacuum housing pressure may be less than about 200 Torr or less than about 100 Torr (e.g., where viscous heat loss through convection of the chromatography column is eliminated). Even more preferably, the vacuum housing pressure may be less than about $10^{-1}$ Torr. Even more preferably, the vacuum housing pressure may be less than approximately $10^{-4}$ Torr (e.g., generally in D1 and less than B1 whereby viscous heat loss through convection and conduction through the chromatography column are eliminated or negligible) to maximize column efficiency. Thus, at pressures less than approximately $10^{-4}$ Torr, heat loss may be approximately due to radiation.

Also, in at least one embodiment, the vacuum housing pressure may generally be about $10^{-4}$ Torr (B1), since for pressures less than $10^{-4}$ Torr there may be essentially no further improvement in chromatography column efficiency once air conduction becomes negligible with respect to radiation. In at least one embodiment, the vacuum housing pressure may generally be about 100 Torr or be about 200 Torr (B3), or may generally be any pressure in Domain D3, to correspond to efficiency levels obtained by elimination of natural air convection. In at least one embodiment, the vacuum housing pressure may be less than or equal to about $10^{-1}$ Torr and also less than about 200 Torr (e.g., $10^{-1}$ Torr$\leq$P<200 Torr). In at least one embodiment, the vacuum housing pressure may be less than or equal to about $10^{-1}$ Torr and also less than about 100 Torr (e.g., $10^{-1}$ Torr$\leq$P<100 Torr). In at least one embodiment, the vacuum housing pressure may generally be in Domain D2, to correspond to efficiency levels obtained by elimination of natural air convection heat loss and at least some reduction in heat loss through conduction.

It should be noted that although examples and description above of techniques herein may be described and used with liquid chromatography, techniques herein may be more generally used in connection with other forms of chromatography known in the art. For example, techniques described herein may be used in connection with supercritical fluid chromatography, also known as carbon dioxide based chromatography and highly compressible fluid chromatography.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An apparatus for performing liquid chromatography comprising:
   a liquid chromatography column; and
   a vacuum insulated jacket for the liquid chromatography column including an inner wall and an outer wall, wherein a vacuum area is formed between the inner wall and the outer wall, and wherein the inner wall of the vacuum insulated jacket surrounds the liquid chromatography column; and
   an unfilled gap that extends from an outer wall of the liquid chromatography column to the inner wall of the vacuum insulated jacket for forming an additional thermal barrier for the liquid chromatography column.

2. The apparatus of claim 1, wherein the vacuum insulated jacket extends beyond a frit at a first end of the liquid chromatography column.

3. The apparatus of claim 2, wherein the vacuum insulated jacket extends beyond an end fitting at the first end of the liquid chromatography column.

4. The apparatus of claim 3, wherein the first end is at an outlet end of the liquid chromatography column.

5. The apparatus of claim 2, wherein the first end is an outlet end for fluid to exit the liquid chromatography column and wherein the vacuum insulated jacket does not extend beyond another frit at an inlet end of the liquid chromatography column for fluid to enter the liquid chromatography column.

6. The apparatus of claim 1, wherein the vacuum insulated jacket extends beyond frits at both an inlet end of the liquid chromatography column for fluid to enter the liquid chromatography column and an outlet end of the liquid chromatography column for fluid to exit the liquid chromatography column, wherein a fluid enters the liquid chromatography column at the inlet end and exits the liquid chromatography column at the outlet end.

7. The apparatus of claim 1, wherein a first end of the liquid chromatography column includes an end fitting that is non-threaded.

8. The apparatus of claim 7, wherein the end fitting includes a face seal, wherein the face seal is substantially ring shaped or disc shaped, and wherein the face seal is made from any of a metal, a polymeric material, and an elastomeric material.

9. The apparatus of claim 8, wherein the end fitting of the liquid chromatography column is connected to another component that is any of an injector, a preheater, and a detector.

10. The apparatus of claim 1, wherein the vacuum insulated jacket is prefabricated.

11. The apparatus of claim 1, wherein a single component includes the vacuum insulated jacket integrated with another component that is any of an injector, a preheater, and a detector.

12. The apparatus of claim 1, wherein the vacuum area comprises at least one of: helium, hydrogen, neon, nitrogen, oxygen, carbon dioxide, argon, sulfur hexafluoride, krypton, and xenon.

13. The apparatus of claim 1, wherein the vacuum insulated jacket is a tube having walls made of steel, and the vacuum area is formed in an area between sealed walls of the tube.

14. The apparatus of claim 1, wherein the vacuum insulated jacket substantially prevents a radial thermal gradient from forming within the liquid chromatographic column.

15. The apparatus of claim 1, further comprising a preheater that heats a mobile phase prior to an inlet of the liquid chromatographic column, and wherein the preheater does not heat ambient air surrounding the vacuum insulated jacket.

16. The apparatus of claim 15, wherein the preheater is configured to receive control signals that control operation of the preheater in accordance with whether a measured temperature is approximately at a specified set point temperature, and wherein the apparatus further comprises a temperature sensor configured to obtain the measured temperature at any of: an outlet end of the liquid chromatography column, an inlet end of the liquid chromatography column, and a location within the preheater thereby providing a current ambient temperature within the preheater.

17. The apparatus of claim 1, wherein the vacuum area is at a pressure of about 10-3 atm or less.

18. The apparatus of claim 1, wherein the vacuum area is at a pressure less than approximately 760 Torr.

19. The apparatus of claim 18, wherein the pressure is included in a range selected from the group consisting of: less than approximately 10-4 Torr; greater than or equal to approximately 10-4 Torr and less than approximately 10-1 Torr; greater than or equal to approximately 10-1 Torr and less than approximately 200 Torr; greater than or equal to approximately 10-1 Torr and less than approximately 100 Torr; and greater than or equal to approximately 200 Torr and less than approximately 750 Torr.

20. The apparatus of claim 18, wherein the pressure is less than a threshold that is selected from a group consisting of: about 100 Torr, about 200 Torr, about 10-1 Torr and about 10-4 Torr.

21. The apparatus of claim 1, wherein a first end fitting is at an inlet end of the liquid chromatographic column and a second end fitting is at an outlet end of the liquid chromatographic column and the first end fitting has a first weight and the second end fitting has a second weight, and wherein the second weight is less than the first weight.

22. The apparatus of claim 21, wherein the second weight is at least about 15% less than the first weight.

23. The apparatus of claim 21, wherein the second weight is equal to or less than about 50% of the first weight.

24. A method of insulating a chromatography column comprising:
   receiving a vacuum insulated jacket for the liquid chromatography column, the vacuum insulated jacket including an inner wall and an outer wall, wherein a vacuum area is formed between the inner wall and the outer wall; and
   inserting the chromatography column into the vacuum insulated jacket, wherein the inner wall of the vacuum insulated jacket surrounds the chromatography column;
   wherein a an unfilled gap extends from an outer wall of the chromatography column to the inner wall of the vacuum insulated jacket for forming an additional thermal barrier for the liquid chromatography column.

25. The method of claim 24, further comprising:
   placing one or more materials in the gap to form an insulation layer, and wherein the one or more materials include at least one of: an insulating foam, an insulating plastic, aerogel, and mylarized aluminum.

* * * * *